US012546971B2

(12) United States Patent
Ishimasa et al.

(10) Patent No.: US 12,546,971 B2
(45) Date of Patent: Feb. 10, 2026

(54) OPTICAL DEVICE AND IMAGE PICKUP APPARATUS

(71) Applicant: CANON KABUSHIKI KAISHA, Tokyo (JP)

(72) Inventors: Toru Ishimasa, Kanagawa (JP); Toshihiro Ogawa, Tokyo (JP); Kohei Matsumoto, Kanagawa (JP); Mitsuru Morohashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 596 days.

(21) Appl. No.: 18/048,379

(22) Filed: Oct. 20, 2022

(65) Prior Publication Data

US 2023/0136002 A1    May 4, 2023

(30) Foreign Application Priority Data

Oct. 28, 2021  (JP) ................................. 2021-176784
Oct. 28, 2021  (JP) ................................. 2021-176785
Oct. 28, 2021  (JP) ................................. 2021-176786

(51) Int. Cl.
  *G02B 7/04*    (2021.01)
  *G02B 7/02*    (2021.01)
  *G03B 17/14*   (2021.01)
  *H04N 23/55*   (2023.01)

(52) U.S. Cl.
  CPC ............... *G02B 7/04* (2013.01); *G02B 7/026* (2013.01); *G03B 17/14* (2013.01); *H04N 23/55* (2023.01)

(58) Field of Classification Search
  CPC .......... G02B 7/04; G02B 7/026; G02B 15/10; G03B 17/14; G03B 17/565; H04N 23/55
  See application file for complete search history.

(56) References Cited

U.S. PATENT DOCUMENTS

| 4,771,303 | A  | * | 9/1988 | Matsumoto ............ G03B 19/07 |
|           |    |   |        | 396/75 |
| 2003/0156832 | A1 | * | 8/2003 | Nomura ................. G03B 17/00 |
|           |    |   |        | 396/72 |

FOREIGN PATENT DOCUMENTS

| DE | 10352969 B4 * | 12/2005 | ............... G02B 7/10 |
| JP | S6334524 A    | 2/1988  | |
| JP | S63135907 A   | 6/1988  | |
| JP | H03135532 A   | 6/1991  | |
| JP | H0545668 U    | 6/1993  | |

(Continued)

OTHER PUBLICATIONS

Gross, Handbook of Optical Systems (Year: 2005).*

*Primary Examiner* — Bumsuk Won
*Assistant Examiner* — John Curtis Sipes
(74) *Attorney, Agent, or Firm* — Canon U.S.A., Inc. IP Division

(57) ABSTRACT

An optical device includes a first lens group corresponding to a first optical axis, and a second lens group corresponding to a second optical axis and configured to change a focal length range of an optical system from a first focal length range to a second focal length range by being disposed on the first optical axis on a side of the first lens group adjacent to an image plane. The first lens group moves toward the image plane in a first direction parallel to the first optical axis. The second lens group moves in a second direction to allow at least part of the second lens group to overlap at least part of the first lens group in the first direction, and the second optical axis withdraws from the first optical axis.

16 Claims, 35 Drawing Sheets

(56) References Cited

FOREIGN PATENT DOCUMENTS

JP          H11311828 A    11/1999
JP          2014134691 A    7/2014

\* cited by examiner

OPTICAL DEVICE AND IMAGE PICKUP APPARATUS

BACKGROUND

Field of the Disclosure

The present disclosure relates to an optical device and an image pickup apparatus that can change the focal length range of a master lens by insertion or withdrawal of an internal conversion lens.

Description of the Related Art

There is a known configuration in which, in optical devices, such as digital cameras, video cameras, and interchangeable lenses, a first focal length range of a master lens is changed to a second focal length range (either to the telephoto side or the wide-angle side) by inserting a conversion lens into optical path.

Japanese Patent Laid-Open No. 11-311828 discloses a technique in which an internal conversion lens in a camera body is moved between an insertion position at which the internal conversion lens is inserted into the optical path and a withdrawal position at which the internal conversion lens is withdrawn outward from the optical path. The internal conversion lens described here is withdrawn into a space between a prism configured to guide a subject image to a finder and a strobe light stored above a lens barrel.

For both first and second focal length ranges, a master lens described in Japanese Patent Laid-Open No. 11-311828 is fixed at substantially the same position in the optical axis direction. Therefore, a space for insertion of the internal conversion lens always needs to be left between the master lens and an image plane where light from a subject is formed into an image. This has been a hindrance to reducing the overall lens length. The master lens described in Japanese Patent Laid-Open No. 11-311828 is moved to the withdrawal position by a dedicated actuator. This means that the lens requires an internal space for accommodating the actuator. Accordingly, it has been difficult to prevent an increase in lens size. Also, the configuration described in Japanese Patent Laid-Open No. 11-311828 is applicable only to a type of lens-integrated camera that includes a prism and a strobe light. Therefore, for interchangeable lenses or cameras that do not include at least one of a prism and a strobe light, it has been difficult to prevent a size increase.

SUMMARY

The aspects of the present disclosure provide an optical device that includes an internal conversion lens, and can shorten the overall lens length while leaving a space for insertion or withdrawal of the internal conversion lens.

An optical device according to an aspect of the present disclosure includes a first lens group corresponding to a first optical axis, and a second lens group corresponding to a second optical axis and configured to change a focal length range of an optical system from a first focal length range to a second focal length range by being disposed on the first optical axis on a side of the first lens group adjacent to an image plane. The first lens group moves toward the image plane in a first direction parallel to the first optical axis. The second lens group moves in a second direction to allow at least part of the second lens group to overlap at least part of the first lens group in the first direction, and the second optical axis withdraws from the first optical axis. An overall length of the optical device in a direction of the first optical axis is shorter when the focal length range of the optical system is the first focal length range than when the focal length range of the optical system is the second focal length range.

Further features of the present disclosure will become apparent from the following description of exemplary embodiments with reference to the attached drawings.

DESCRIPTION OF THE EMBODIMENTS

Figure 1:
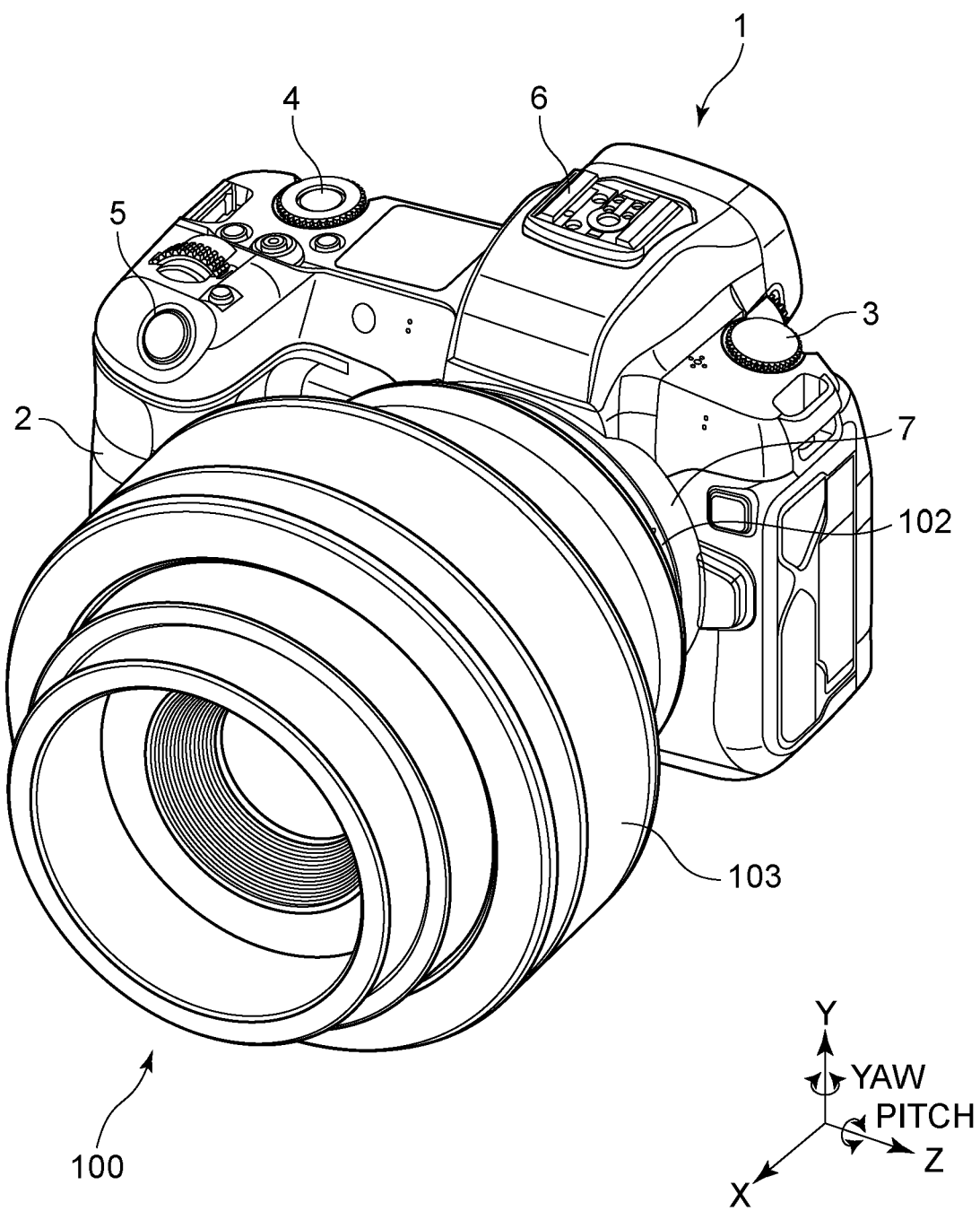
FIG. 1 is a front perspective view of an interchangeable lens (second focal length range) and a camera body according to embodiments of the present disclosure.

Hereinafter, embodiments of the present disclosure will be described with reference to the drawings. Throughout the drawings, the same or corresponding components are denoted by the same reference numerals. Although an interchangeable lens, which is an example of an optical device, will be described in embodiments, the present disclosure is also applicable, for example, to lens-integrated cameras, and may be variously modified and changed within the scope of the gist thereof.

Before specific description of how embodiments are implemented, structures common to the embodiments will be described.

Figure 2:
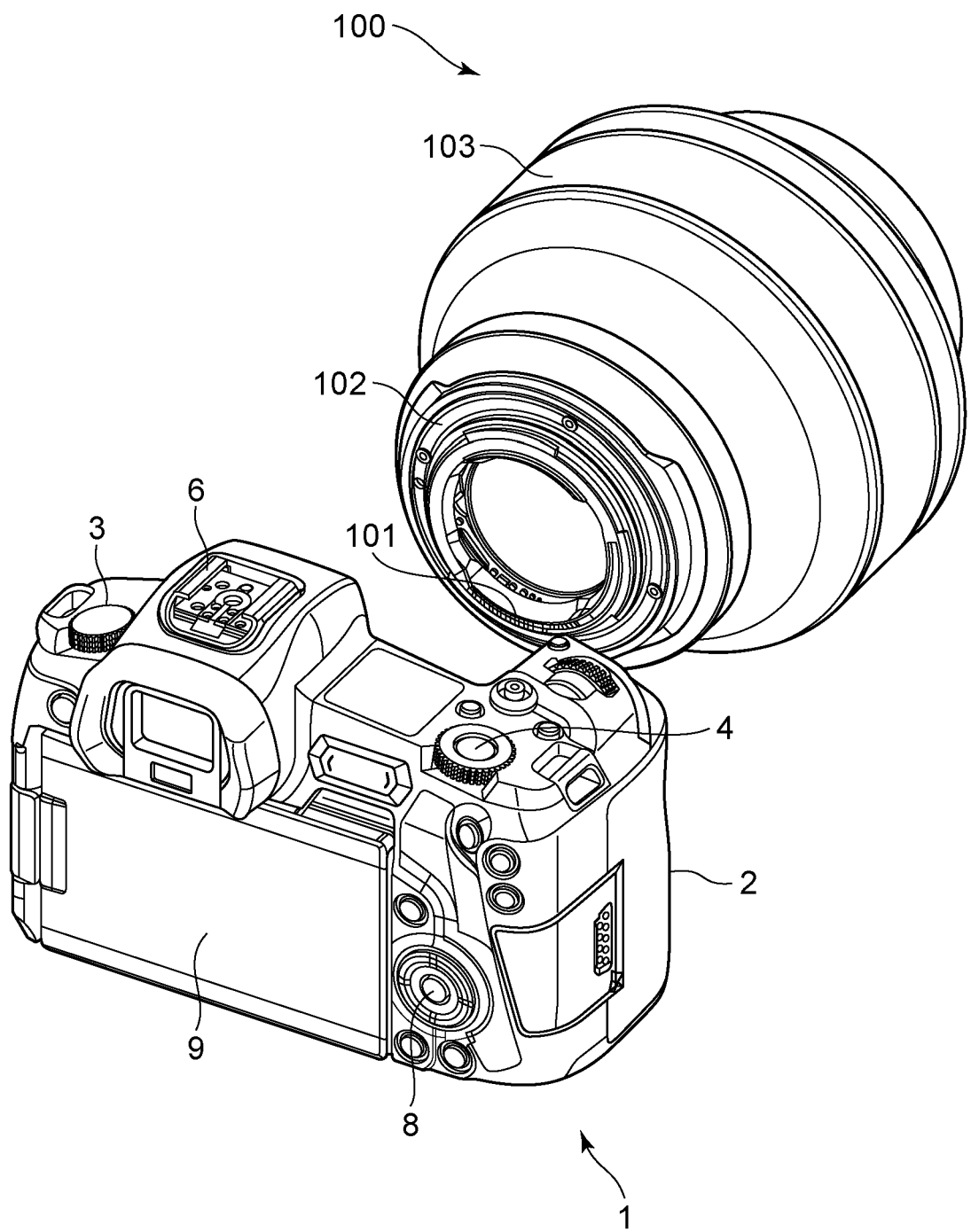
FIG. 2 is a back perspective view of the interchangeable lens (second focal length range) and the camera body (with the interchangeable lens detached therefrom) according to embodiments of the present disclosure.

FIG. 1 and FIG. 2 are external views of an optical device (hereinafter referred to as an interchangeable lens) 100 and a digital camera (hereinafter referred to as a camera body) 1 serving as an image pickup apparatus to which the interchangeable lens 100 is detachably attached, according to embodiments of the present disclosure. FIG. 1 is a front perspective view of the interchangeable lens 100 (second focal length range) and the camera body 1 according to embodiments of the present disclosure, and FIG. 2 is a back perspective view of the interchangeable lens 100 (second focal length range) and the camera body 1 (with the interchangeable lens 100 detached therefrom) according to embodiments of the present disclosure. In embodiments of the present disclosure, as illustrated in FIG. 1, an optical axis direction or a direction in which the optical axis of an image pickup optical system housed in the interchangeable lens 100 extends (i.e., a direction along the optical axis) is referred to as an X axis direction, and directions orthogonal to the X axis direction are referred to as a Z axis direction (horizontal direction) and a Y axis direction (vertical direction). The Z axis direction and the Y axis direction may be collectively referred to as a Z/Y axis direction. The direction of rotation about the Z axis is referred to as a pitch direction, and the direction of rotation about the Y axis is referred to as a yaw direction.

The pitch direction and the yaw direction (which may hereinafter be collectively referred to as a pitch/yaw direction) are the directions of rotation about two axes, the Z axis and the Y axis, which are orthogonal to each other.

The camera body 1 illustrated in FIG. 1 has a grip 2 on the left side as viewed from the front (or on the right side as viewed from the back). The grip 2 allows the user to hold the camera body 1 by hand. The camera body 1 has a power operation portion 3 on the upper surface thereof. When the user turns on the operation portion 3 of the camera body 1 in the power-off state, a current starts to flow and the camera body 1 is powered on. A computer program for, for example, origin detection processing for a focus group including a focus lens is executed, and an image pickup standby state is entered. Conversely, when the user turns off the power operation portion 3 of the camera body 1 in the power-on state, the camera body 1 is powered off.

The camera body 1 also has a mode dial 4, a release button 5, and an accessory shoe 6 on the upper surface thereof. The user's turning of the mode dial 4 can switch the image pickup mode. Examples of the image pickup mode include a manual still-image pickup mode in which the user can set image pickup conditions, such as a shutter speed and an f-number, an automatic still-image pickup mode in which a proper amount of exposure is automatically achieved, and a moving-image pickup mode for picking up a moving image.

A user's half-press of the release button 5 can give an instruction to perform an image pickup preparation, such as autofocus or automatic exposure control, and a user's full-press of the release button 5 can give an instruction to perform an image pickup operation. An illuminating device, such as an external flash, or an accessory (camera accessory) for a light emitting device is detachably attached to the accessory shoe 6.

The interchangeable lens 100 has a lens mount 102 that can be mechanically connected to a camera mount 7 of the camera body 1. The interchangeable lens 100 also has an electrical connecting member 101, which is electrically connected to the camera body 1. As illustrated in FIG. 2, the electrical connecting member 101 according to embodiments of the present disclosure is disposed in the lower phase of the lens mount 102 in the circumferential direction. However, the present disclosure is not limited to this, and the electrical connecting member 101 may be disposed in the upper phase.

The interchangeable lens 100 includes therein an image pickup optical system that collects light from a subject to form a subject image on the image plane. The outer periphery of the interchangeable lens 100 is provided with a focus operation ring (operation member) 103 that can be rotated about the optical axis by a user's operation. For example, when the user turns the focus operation ring 103 in manual focus mode, at least one of lens groups (e.g., focus group) constituting the image pickup optical system is moved to a predetermined use position corresponding to the angle of the focus operation ring 103. This allows the user to perform desired focusing (focus adjustment).

As illustrated in FIG. 2, the camera body 1 has a backside operation unit 8 and a display unit 9 on the back side thereof. The backside operation unit 8 includes a plurality of buttons and dials to which various functions are assigned. When the camera body 1 is in the power-on state and either the still-image or moving-image pickup mode is set, the display unit 9 displays a live view of a subject image picked up by an image pickup element (described below). The display unit 9 also displays image pickup parameters representing image pickup conditions, such as a shutter speed and an f-number. The user can change the set values of image pickup parameters by operating the backside operation unit 8 while viewing the display. The backside operation unit 8 includes a playback button used to view a recorded picked-up image. By operating the playback button, the user can display the picked-up image in the display unit 9. The display unit 9 may be of a touch panel type having the same functions as the backside operation unit 8.

Figure 3:
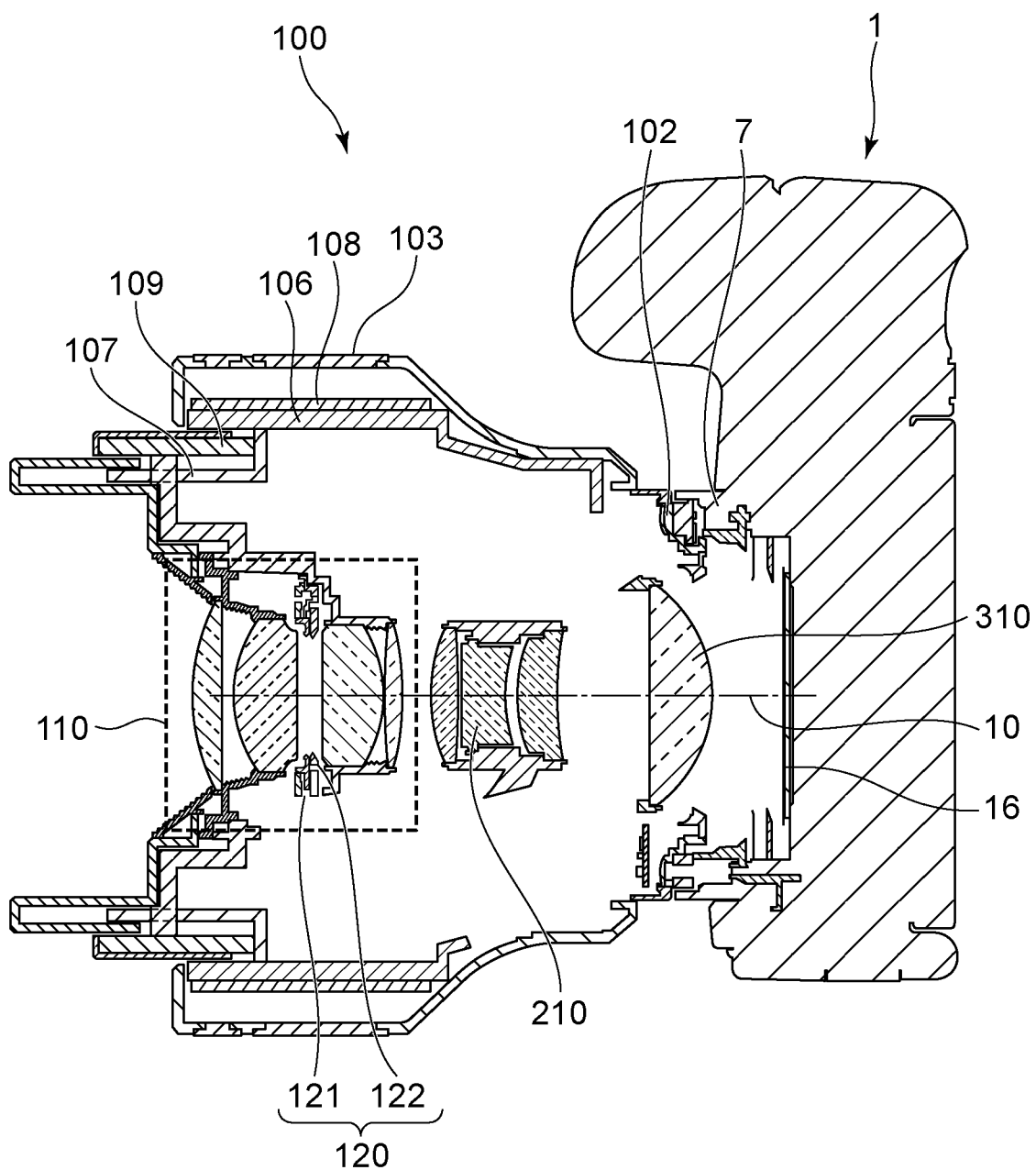
FIG. 3 is a cross-sectional view of the interchangeable lens (second focal length range) and the camera body according to embodiments of the present disclosure.
Figure 4:
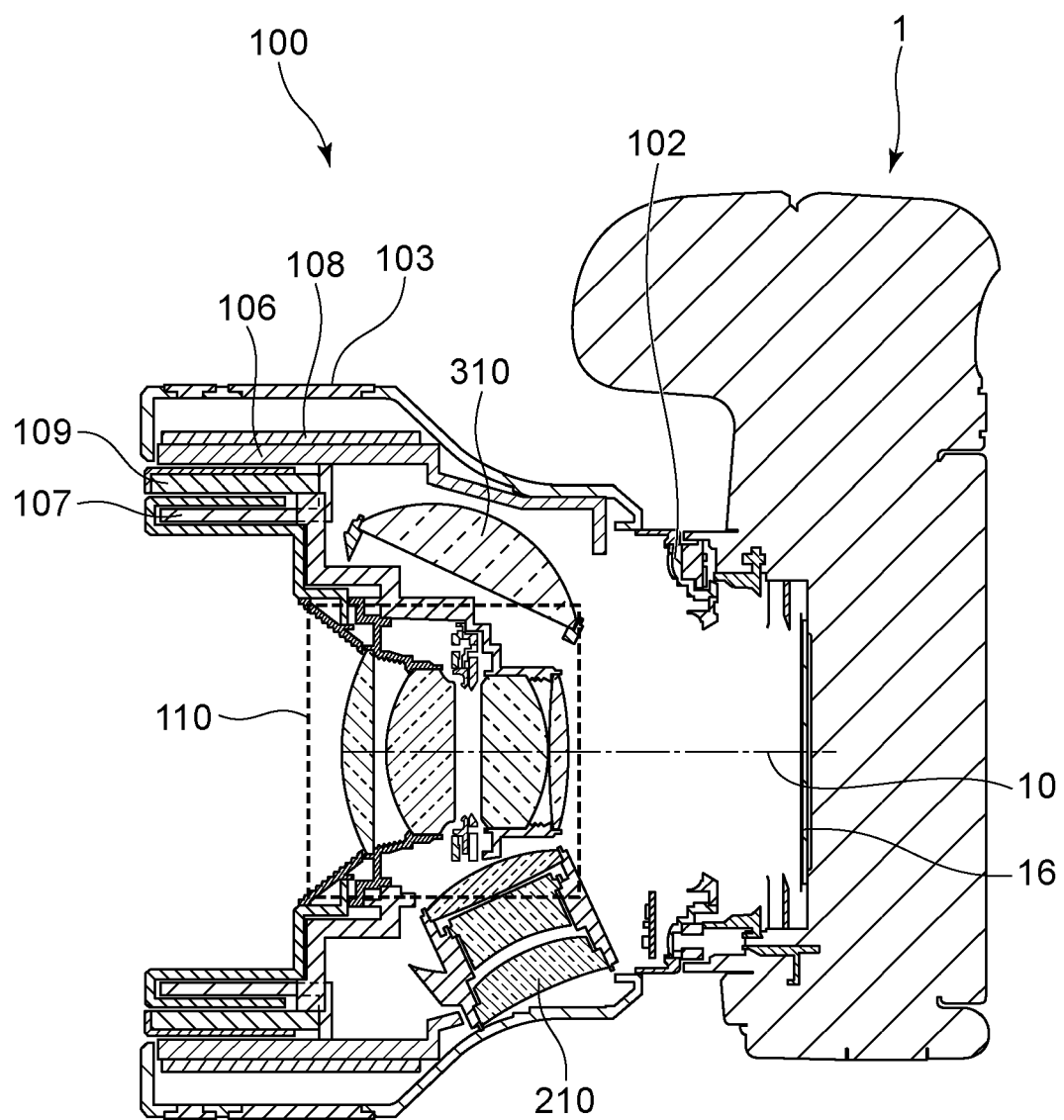
FIG. 4 is a cross-sectional view of the interchangeable lens (first focal length range) and the camera body according to embodiments of the present disclosure.

With reference to FIG. 3 and FIG. 4, the positional relations of components constituting the interchangeable lens 100 according to embodiments of the present disclosure will be described. FIG. 3 and FIG. 4 are cross-sectional views taken along the XZ plane containing a first optical axis 10. The center line illustrated here is synonymous with the X axis described above, as it substantially coincides with the first optical axis 10 determined by the first lens group 110. An image plane 16 is synonymous with the YZ plane, as it is orthogonal to the first optical axis 10. FIG. 3 is a cross-sectional view of the interchangeable lens 100 (second focal length range) and the camera body 1 according to embodiments of the present disclosure, and FIG. 4 is a cross-sectional view of the interchangeable lens 100 (first focal length range) and the camera body 1 according to embodiments of the present disclosure.

FIG. 3 illustrates a configuration in which the second lens group 210 and the third lens group 310 are disposed on the image plane side of the first lens group 110 to provide a second focal length range. FIG. 4 illustrates a configuration in which the second lens group 210 and the third lens group 310 are withdrawn from the first optical axis 10 and the first lens group 110 is moved into the vacated space to provide a first focal length range.

The overall length of the interchangeable lens 100 according to embodiments of the present disclosure is long in FIG. 3 and short in FIG. 4, and image pickup is possible in both states.

The image pickup optical system of the interchangeable lens 100 is constituted by the first lens group 110 serving as a master lens, and the second lens group 210 and the third lens group 310 serving as an extender lens, which is a type of conversion lens. The first lens group 110 has the first focal length range, and the second lens group 210 and the third lens group 310 are configured to change the first focal length range to the second focal length range by being inserted into the first optical axis 10 on the side of the first lens group 110 adjacent to the image plane 16. The first focal length range corresponds to a wide-angle side (short focus), and the second focal length range corresponds to a telephoto side (long focus). The interchangeable lens 100 includes a first cam cylinder 108 and a second cam cylinder 109 that are configured to move the first lens group 110, which serves as the master lens, in the direction of the first optical axis 10. Thus, in both the first and second focal length ranges, the first lens group 110 is movable in the direction of the first optical axis 10 and desired focusing (focus adjustment) can be made.

While described in detail below, the interchangeable lens 100 according to embodiments of the present disclosure can switch between the first focal length range and the second focal length range by combining, for example, a user's operation with an operation by a dedicated actuator. FIG. 1 to FIG. 3 illustrate an example where the interchangeable lens 100 provides the second focal length range corresponding to the telephoto side. When, in the state of the second focal length range (telephoto side), the user turns the focus operation ring 103 toward ultra-infinity, the first lens group 110 is moved toward the image plane 16 in conjunction with the rotation of the focus operation ring 103. At the same time, the second lens group 210 and the third lens group 310 are withdrawn from the first optical axis 10 to respective withdrawal positions. Thus, by moving the first lens group 110 to the vacated space and bringing it further toward the image plane 16, the overall length of the interchangeable lens 100 is shortened as illustrated in FIG. 4.

In embodiments of the present disclosure, the master lens is composed of a single group and the extender lens is composed of two groups. However, the present disclosure does not limit the configuration of the image pickup optical system. For example, the master lens may be composed of multiple groups, or may include another independent focus group or lens stabilization group. The extender lens may be composed only of a single group. The conversion lens of the present disclosure may be a wide conversion lens, a macro lens, or a reducer lens, instead of the extender lens described in the embodiments of the present disclosure.

The first lens group 110 includes an aperture group 120 for adjusting the amount of light. The aperture group 120 includes an aperture drive unit (not shown), a plurality of aperture blades 121, and a drive ring 122. To adjust the amount of light, the aperture drive unit changes the aperture shape of the aperture blades 121 by means of the drive ring 122.

A fixed cylinder 106 is a fixed member secured to the lens mount 102. The fixed cylinder 106 has a straight guiding groove (not shown) divided into three equal parts in the circumferential direction. The straight guiding groove in the fixed cylinder 106 is fitted to a straight guiding key (not shown) on a straight guiding cylinder 107. This regulates the movement of the straight guiding cylinder 107 in the rotational direction and guides the straight guiding cylinder 107 in the direction of the first optical axis 10. The first cam cylinder 108 is held by a bayonet (not shown) on the outer periphery of the fixed cylinder 106 in such a way as to be rotatable about the first optical axis 10. The first cam cylinder 108 is coupled through a coupling key (not shown) to the focus operation ring 103. Like the fixed cylinder 106, the straight guiding cylinder 107 has a straight guiding groove (not shown) divided into three equal parts in the circumferential direction. The straight guiding groove in the straight guiding cylinder 107 is fitted to a straight guiding key (not shown) on the first lens group 110. This regulates the movement of the first lens group 110 in the rotational direction and guides the first lens group 110 in the direction of the first optical axis 10. The second cam cylinder 109 is held by a bayonet (not shown) on the outer periphery of the straight guiding cylinder 107 in such a way as to be rotatable about the first optical axis 10.

The first cam cylinder 108 and the second cam cylinder 109 are internally provided with first and second cam grooves (not shown), respectively, each divided into three equal parts in the circumferential direction. The first and second cam grooves are fitted to respective cam followers (not shown) on the straight guiding cylinder 107 and the first lens group 110. The second cam cylinder 109 is configured to move integrally with the straight guiding cylinder 107 in the direction of the first optical axis 10. The first cam cylinder 108 and the second cam cylinder 109 are rotationally regulated by a coupling key (not shown) and configured to rotate in conjunction with each other in the circumferential direction while relatively moving in the direction of the first optical axis 10. Therefore, when the focus operation ring 103 is turned by the user, the first lens group 110 moves through the straight guiding cylinder 107 and the second cam cylinder 108 in the direction of the first optical axis 10 while its movement in the rotational direction is regulated.

In embodiments of the present disclosure, the configuration of a so-called two-stage collapsible lens barrel allows the first lens group 110 to move into the space created by withdrawal of the second lens group 210 and the third lens group 310. In particular, when the interchangeable lens 100 provides the first focal length range (wide-angle side) as illustrated in FIG. 4, bringing the first lens group 110 toward the image plane 16 can shorten the overall length of the interchangeable lens 100 and make it possible to achieve high portability. The configuration of such a lens barrel will not be described in detail here, as it is a known technique that has been adopted in many optical devices.

As described above, the present disclosure is characterized in that a space created after withdrawal of a lens group by switching from a focal length range (telephoto side) to another focal length range (wide-angle side) is used to shorten the overall lens length. There have been related techniques in which the overall lens length in the optical axis direction is shortened by withdrawing a retractable lens group from the optical axis of an image pickup optical system, reducing the distance between lens groups, and moving the lens groups to respective positions close to each other. However, these techniques are ones that adopt a collapsible mechanism for switching from an image-pickup state to a non-image-pickup state, and do not allow image pickup in a collapsed state where the overall lens length is shortened. This means that although high portability is achieved, it takes extra time for transition from a collapsed state where image pickup is not allowed to a state where image pickup is possible.

Unlike the related techniques, the first lens group 110 according to embodiments of the present disclosure has the first focal length range which allows image pickup to be performed by the first lens group 110 alone; that is, image pickup is possible even in the state of FIG. 4 where the overall lens length is shortened. As compared to optical devices that adopt a typical collapsible mechanism, the interchangeable lens 100 requires less time before start of image pickup and can reduce loss of image pickup opportunities while achieving high portability.

The description of the structures common to embodiments of the present disclosure ends here.

First Embodiment

Figure 5:
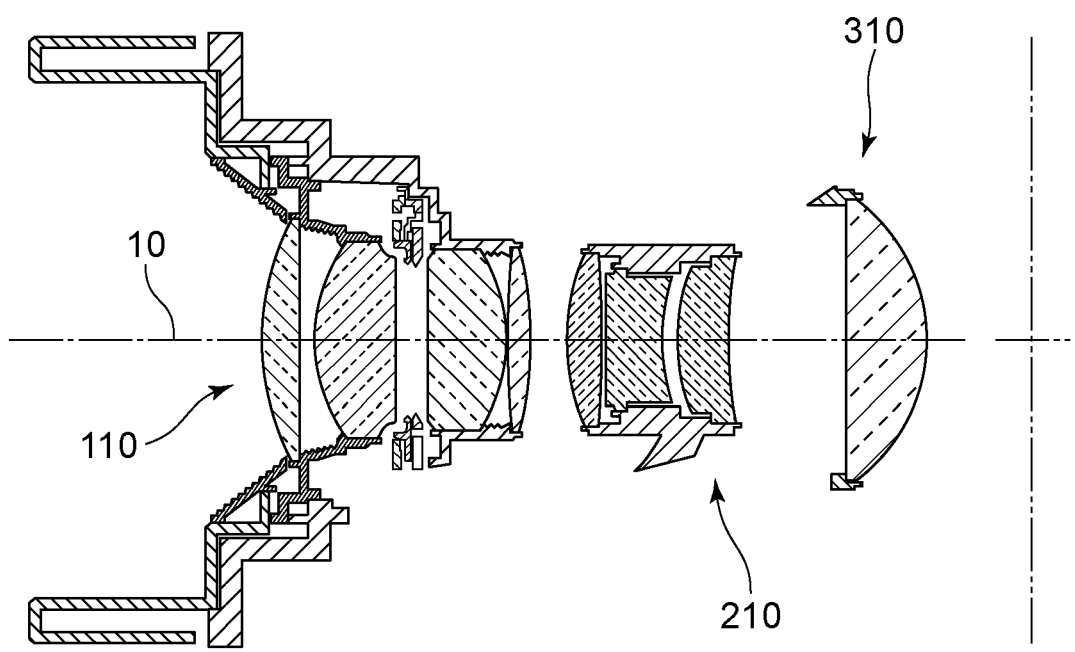
FIG. 5 is a cross-sectional view of each lens group in the interchangeable lens (second focal length range) according to embodiments of the present disclosure.
Figure 10:
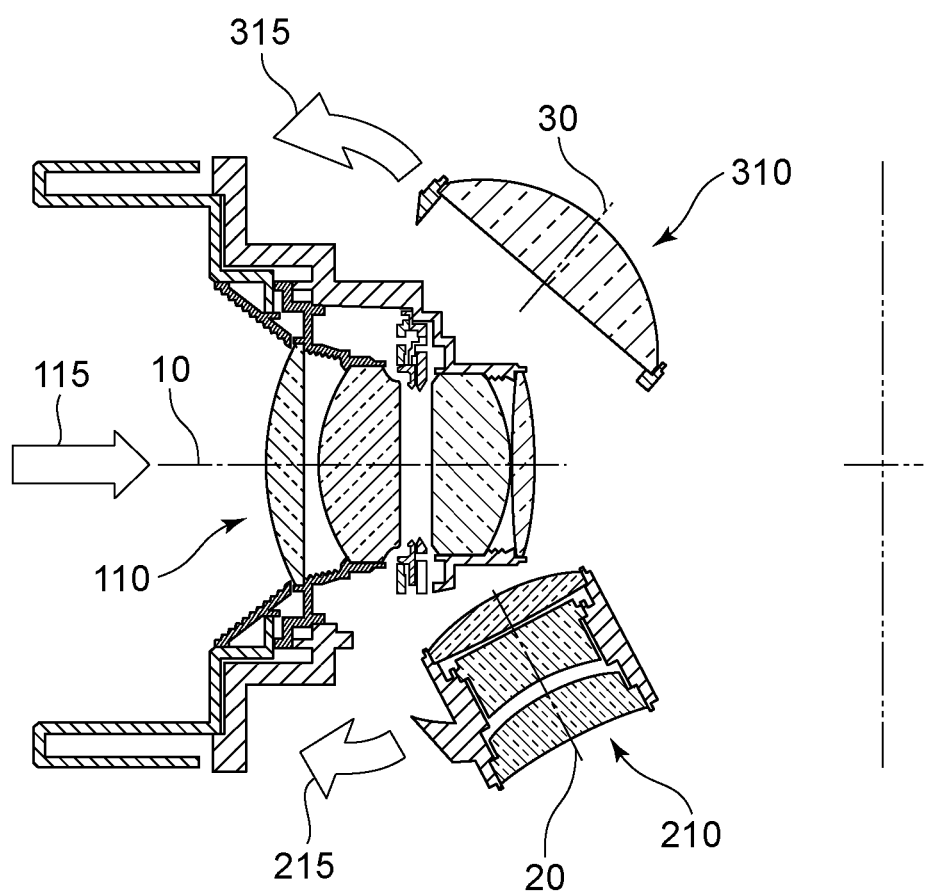
FIG. 10 is a cross-sectional view of each lens group in the interchangeable lens (during transition) according to the first embodiment.
Figure 11:
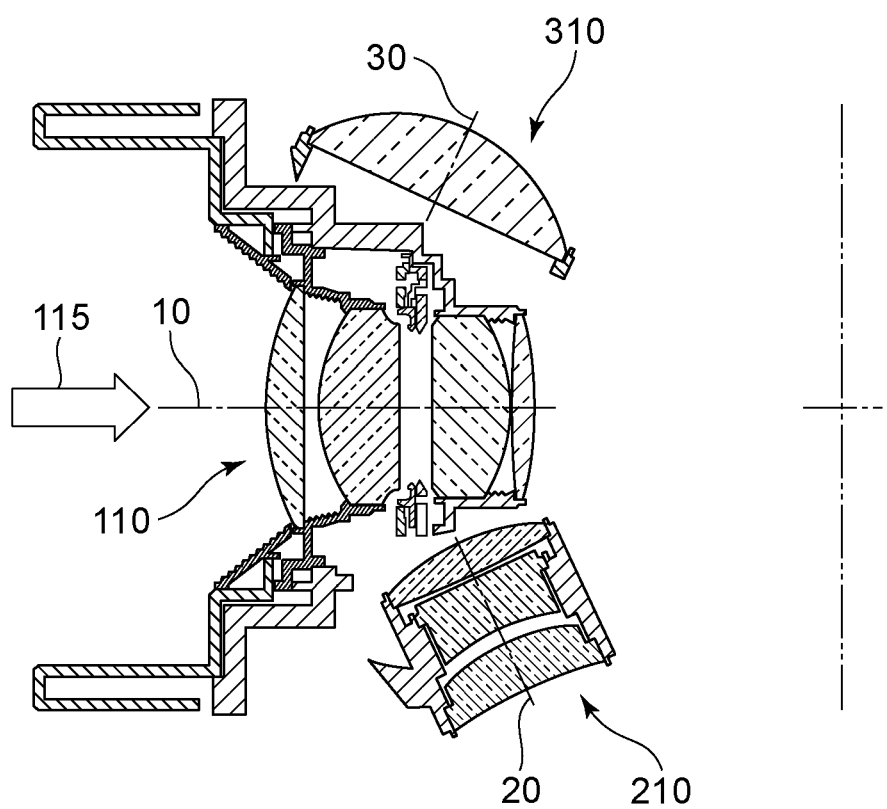
FIG. 11 is a cross-sectional view of each lens group in the interchangeable lens (during transition) according to the first embodiment.
Figure 12:
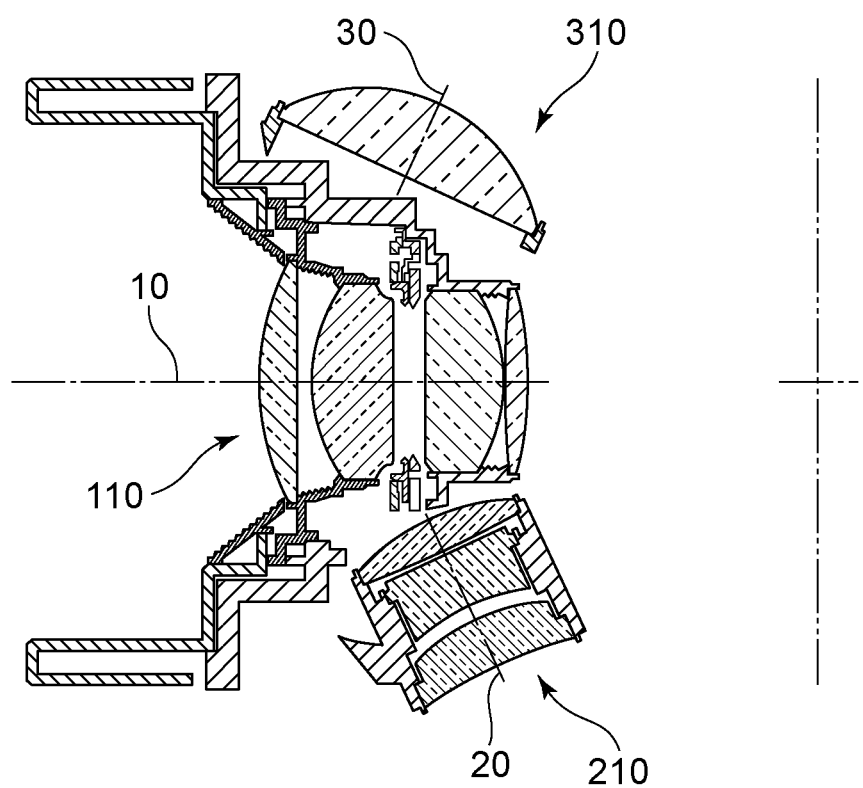
FIG. 12 is a cross-sectional view of each lens group in the interchangeable lens (first focal length range) according to the first embodiment.

With reference to FIG. 5 to FIG. 12, movement of each lens group of the interchangeable lens 100 according to a first embodiment will be described in detail. FIG. 5 to FIG. 12 are cross-sectional views of the first lens group 110, the second lens group 210, and the third lens group 310 taken along the XZ plane containing the first optical axis 10. FIG. 5 to FIG. 12 illustrate a transition from the second focal length range to the first focal length range. FIG. 5 is a cross-sectional view of each lens group in the interchangeable lens 100 (second focal length range) according to the present embodiment. FIG. 6 to FIG. 11 are cross-sectional views of each lens group in the interchangeable lens 100 (during transition) according to the present embodiment. FIG. 12 is a cross-sectional view of each lens group in the interchangeable lens 100 (first focal length range) according to the present embodiment.

FIG. 5 illustrates the interchangeable lens 100 that provides the second focal length range. As illustrated, the first lens group 110, the second lens group 210, and the third lens group 310 are arranged in this order from the subject side, at given positions on the first optical axis 10. When the interchangeable lens 100 provides the second focal length range, desired focusing (focus adjustment) can be performed by moving the first lens group 110 along the first optical axis 10. This does not involve positional movement of the second lens group 210 and the third lens group 310.

Figure 6:
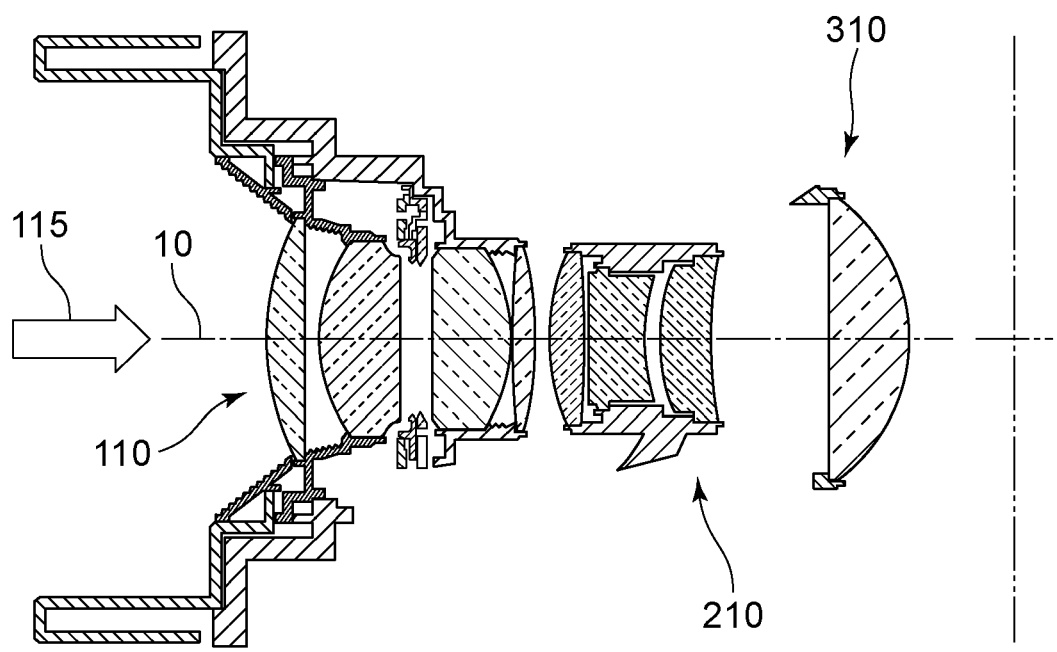
FIG. 6 is a cross-sectional view of each lens group in the interchangeable lens (during transition) according to a first embodiment.
Figure 7:
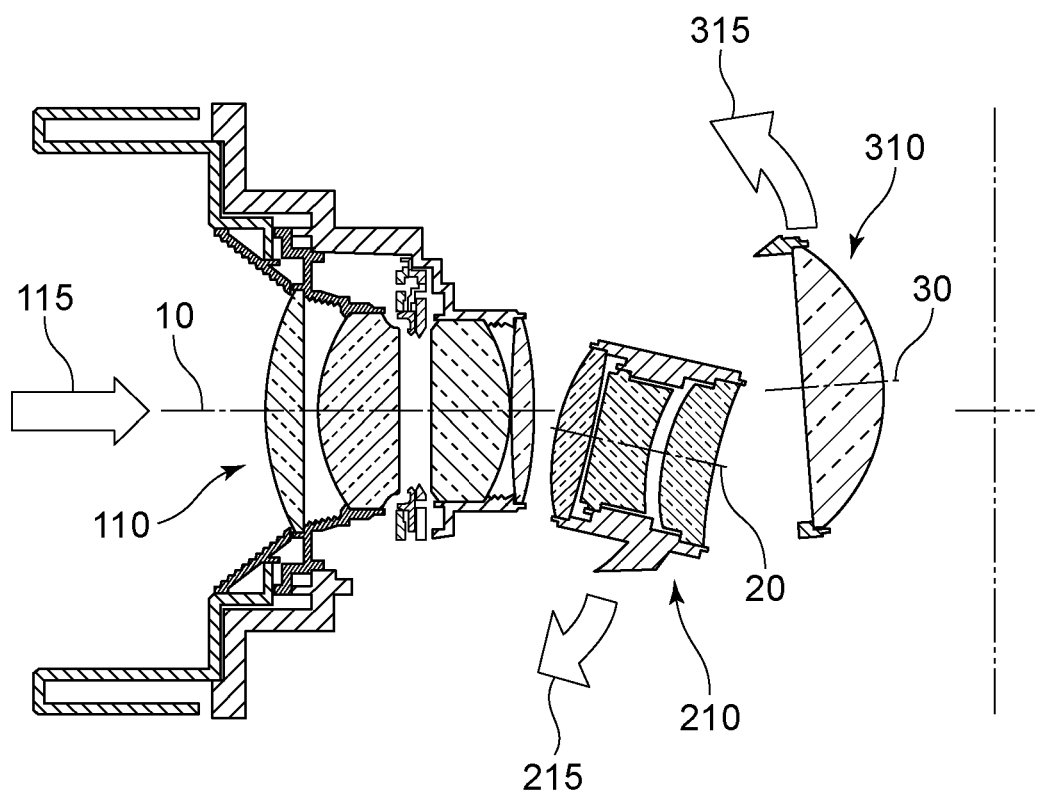
FIG. 7 is a cross-sectional view of each lens group in the interchangeable lens (during transition) according to the first embodiment.

When the interchangeable lens 100 makes a transition from the second focal length range to the first focal length range, first, the first lens group 110 starts to move in a first direction 115 substantially parallel to the first optical axis 10 (FIG. 6). As the first lens group 110 further moves toward the image plane 16 in the first direction 115, the second lens group 210 and the third lens group 310 start to withdraw in a second direction 215 and a third direction 315, respectively (FIG. 7). As a driving source (not shown) for withdrawal of the second lens group 210 and the third lens group 310, the present embodiment assumes an actuator corresponding to each lens. However, the present disclosure is not limited to this. For example, a configuration of an optical device that adopts a collapsible mechanism, such as that described above, is disclosed in which a retractable lens is moved by driving force of a zoom motor that shortens the overall lens length. The present disclosure may be implemented by combining the techniques described above.

As for the directions of withdrawal of the second lens group 210 and the third lens group 310, the second direction 215 and the third direction 315 are opposite each other, with the first optical axis 10 therebetween. This can reduce vibration and changes in the center of gravity that occur as the second lens group 210 moves in the second direction 215 and the third lens group 310 moves in the third direction 315.

FIG. 5 to FIG. 12 are cross-sectional views taken along the XZ plane as described above. FIG. 2 shows that the electrical connecting member 101 is located on the Y axis. The phases in which the second lens group 210 and the third lens group 310 withdraw thus differ from the phase of the electrical connecting member 101. This allows efficient use of space around the lens mount 102 and enables size reduction of the interchangeable lens 100.

Figure 8:
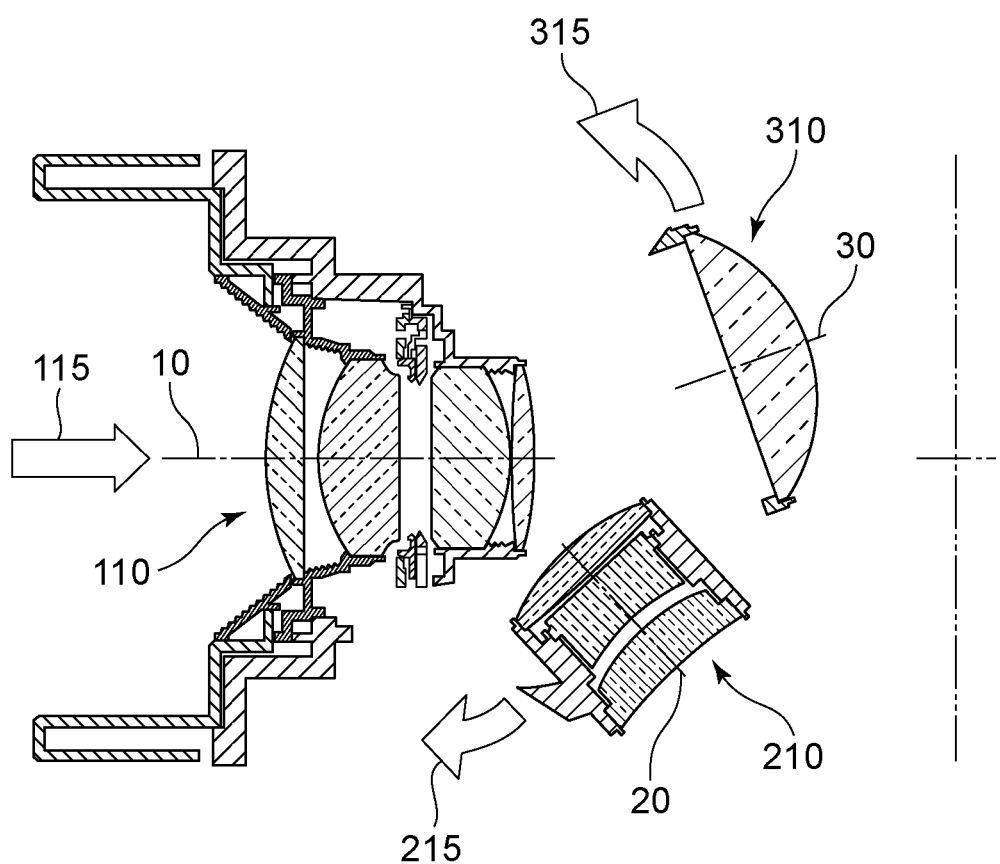
FIG. 8 is a cross-sectional view of each lens group in the interchangeable lens (during transition) according to the first embodiment.
Figure 9:
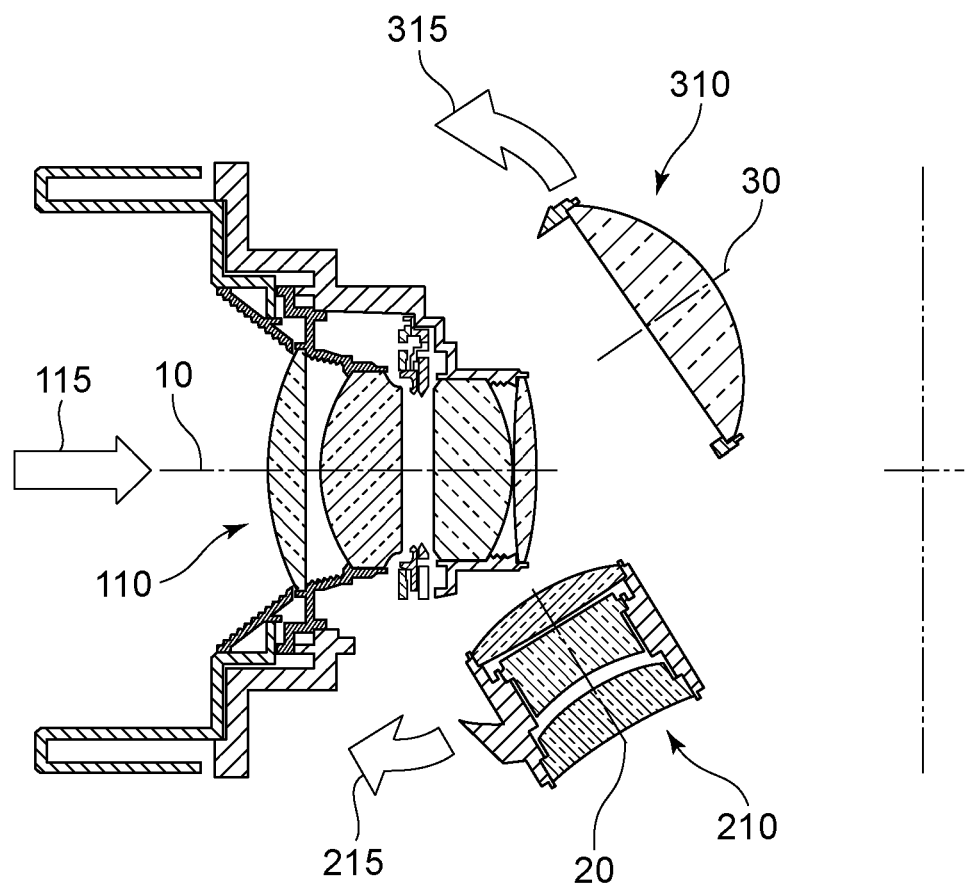
FIG. 9 is a cross-sectional view of each lens group in the interchangeable lens (during transition) according to the first embodiment.

When the second lens group 210 withdraws further in the second direction 215 and the third lens group 310 withdraws further in the third direction 315, the first lens group 110 moves into the space created by the withdrawal of the second lens group 210 and the third lens group 310 (FIG. 8 to FIG. 10). A second optical axis 20 is the optical center of the second lens group 210, and a third optical axis 30 is the optical center of the third lens group 310. As the withdrawal proceeds, the angles of the second optical axis 20 and the third optical axis 30 with respect to the first optical axis 10 both increase. The second lens group 210 and the third lens group 310 are both larger in lens diameter than in lens thickness. Therefore, as compared to withdrawing each lens group parallel to the radial direction, withdrawing it at an angle can save more space in the radial direction and can more effectively prevent size increase of the interchangeable lens 100.

FIG. 11 illustrates the second lens group 210 and the third lens group 310 that have completed the withdrawal to given positions. Even after completion of the withdrawal of the second lens group 210 and the third lens group 310, the first lens group 110 continues to move in the first direction 115. Then, when the first lens group 110 further moves in the first direction 115 and completes the movement to a given position, the transition from the second focal length range to the first focal length range ends (FIG. 12).

The first lens group 110 illustrated in FIG. 12 is closer to the image plane 16 than that illustrated in any of FIG. 5 to FIG. 11 is. The transition from the second focal length range to the first focal length range can thus shorten the overall length of the interchangeable lens 100. Since the first lens group 110 has the first focal length range, image pickup is possible even when the overall lens length is minimized by completion of the withdrawal of the second lens group 210 and the third lens group 310 and the movement of the first lens group 110 toward the image plane 16. Even when the interchangeable lens 100 provides the first focal length range, desired focusing (focus adjustment) can be performed by moving the first lens group 110 along the first optical axis 10.

A transition from the second focal length range to the first focal length range has been described. Conversely, for a transition from the first focal length range to the second focal length range, the process illustrated in FIG. 5 to FIG. 12 is carried out in reverse order. For example, when the first lens group 110 is moved from the image plane side toward the subject side by a user's operation, the second lens group 210 rotates to move from the withdrawal position illustrated in FIG. 11 and FIG. 12 to the position on the first optical axis 10 illustrated in FIG. 6. The driving source for rotationally moving the second lens group 210 is a dedicated actuator (not shown). When the second focal length range is provided, the second lens group 210 is rotationally regulated by holding force of the actuator and secured in place on the first optical axis 10.

When the interchangeable lens 100 makes a transition again from the second focal length range to the first focal length range, the dedicated actuator (not shown) moves the second lens group 210 to the withdrawal position. The interchangeable lens 100 according to the present embodiment is thus configured to be capable of switching between the first focal length range and the second focal length range by combining a user's operation with an operation by the dedicated actuator.

Figure 13A:
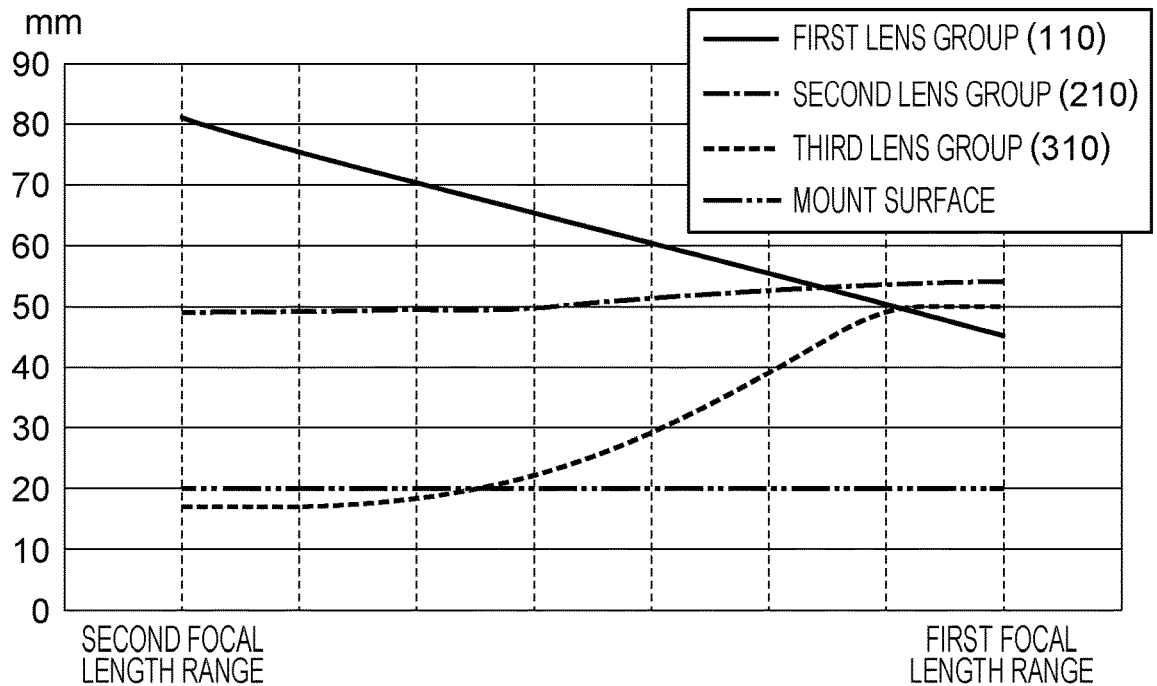
FIG. 13A is a graph showing a distance between each lens group and an image plane of the interchangeable lens (during transition) in the optical axis direction according to the first embodiment.

FIG. 13A is a graph showing a distance between each lens group and the image plane 16 of the interchangeable lens 100 (during transition) in the optical axis direction, according to the present embodiment. Specifically, FIG. 13A shows the distance from the center of gravity of each of the first lens group 110, the second lens group 210, and the third lens group 310 to the image plane 16 in the direction of the first optical axis 10 during transition of the interchangeable lens 100 from the second focal length range to the first focal length range. In FIG. 13A, the horizontal axis represents the number of steps, and the vertical axis represents the distance to the image plane 16. Note that the number of steps represents a degree of transition from the second focal length range to the first focal length range.

As the transition from the second focal length range to the first focal length range proceeds, the distance between the image plane 16 and the first lens group 110 decreases and is minimized in the first focal length range. On the other hand, the distance between the image plane 16 and the second lens group 210 is minimized in the second focal length range. As the transition from the second focal length range proceeds, the distance between the image plane 16 and the second lens group 210 gradually increases up to the middle and then stays virtually unchanged. This indicates that as the first lens group 110 approaches the second lens group 210, the second lens group 210 moves toward the subject side in the direction of the first optical axis 10.

Also, in the transition from the second focal length range to the first focal length range, the distance between the image plane 16 and the third lens group 310 is minimized in the second focal length range. As the transition from the second focal length range proceeds, the distance between the image plane 16 and the third lens group 310 gradually increases. This indicates that as the first lens group 110 approaches the third lens group 310, the third lens group 310 moves toward the subject side in the direction of the first optical axis 10.

As a reference, FIG. 13A also shows a distance from the connection surface (mount surface) of the camera mount 7 and the lens mount 102 to the image plane 16. In the direction of the first optical axis 10, the first lens group 110 and the second lens group 210 are always closer to the subject than the mount surface is. On the other hand, when the second focal length range is provided, the third lens group 310 at least partially overlaps the mount surface. When the first focal length range is provided, the third lens group 310 withdraws, like the second lens group 210, to a position not overlapping the lens mount 102 in the direction of the first optical axis 10.

Figure 13B:
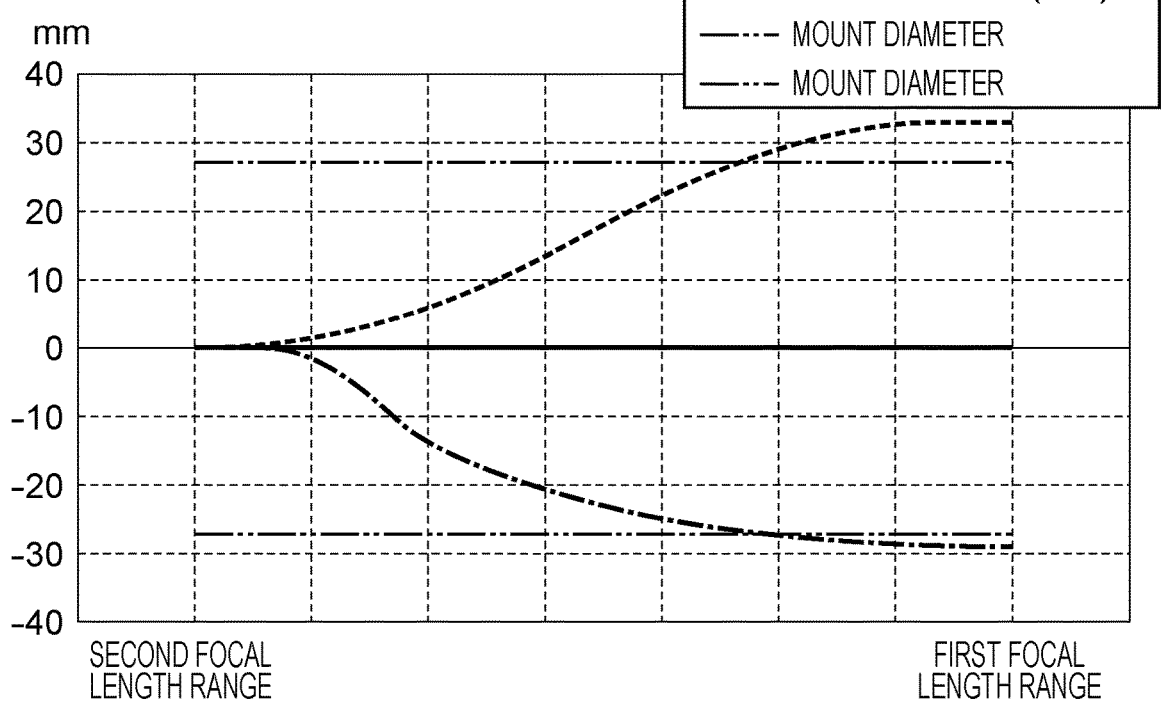
FIG. 13B is a graph showing a distance between each lens group and the optical axis of the interchangeable lens (during transition) in the radial direction according to the first embodiment.

FIG. 13B is a graph showing a distance from the first optical axis 10 to the center of gravity of each of the first lens group 110, the second lens group 210, and the third lens group 310 in the radial direction during transition of the interchangeable lens 100 from the second focal length range to the first focal length range. In FIG. 13B, the horizontal axis represents the number of steps, and the vertical axis represents the distance to the first optical axis 10. As in FIG. 13A, the number of steps represents a degree of transition from the second focal length range to the first focal length range.

As described above, the first lens group 110 moves in the first direction 115 substantially parallel to the first optical axis 10. Therefore, even when a transition from the second focal length range to the first focal length range takes place, the distance from first optical axis 10 to the first lens group 110 in the radial direction remains unchanged. As the transition from the second focal length range to the first focal length range proceeds, however, the second lens group 210 becomes distant from the first optical axis 10 as it withdraws in the second direction 215.

Also, as the transition from the second focal length range to the first focal length range proceeds, the third lens group 310 withdraws in the third direction 315 opposite the second direction 215. This means that as the third lens group 310 moves away from the first optical axis 10, it also becomes distant from the second lens group 210. In the present embodiment, as the center of gravity of the third lens group 310 moves in the third direction 315 toward the grip 2 of the camera body 1, the center of gravity of the second lens group 210 moves in the second direction 215 opposite the third direction 315, with the first optical axis 10 therebetween. By thus cancelling out changes in the center of gravity, it is possible to reduce vibration and allow the user to perform image pickup by holding the camera body 1 by hand without a feeling of strangeness.

As a reference, FIG. 13B also shows a distance from the fitting diameter (mount diameter) of the camera mount 7 and the lens mount 102 to the first optical axis 10. The first lens group 110 is always disposed on the first optical axis 10 in a plane substantially parallel to the image plane 16, that is, as viewed in the direction of the first optical axis 10. On the other hand, while the second lens group 210 and the third lens group 310 are disposed on the first optical axis 10 when the second focal length range is provided, they are withdrawn from the first optical axis 10 when the first focal length range is provided. As shown in FIG. 13B, the second lens group 210 and the third lens group 310 are each withdrawn to a position where it is partially disposed radially outside the fitting diameter (mount diameter) of the camera mount 7 and the lens mount 102 in a plane substantially parallel to the image plane 16, that is, as viewed in the direction of the first optical axis 10.

As described above, the first lens group 110 according to the present embodiment moves toward the image plane 16 in the first direction 115 substantially parallel to the first optical axis 10. At the same time, by moving in the second direction 215, the second lens group 210 according to the present embodiment moves toward the subject in the direction of the first optical axis 10 and moves in a direction away from the first optical axis 10 in the radial direction. Also, by moving in the third direction 315, the third lens group 310 according to the present embodiment moves toward the subject in the direction of the first optical axis 10 and moves in a direction away from the second lens group 210 in the radial direction. The transition from the second focal length range to the first focal length range is thus completed.

In the present embodiment, the overall lens length can be shortened by withdrawing the second lens group 210 and the third lens group 310 to change the focal length range and moving the first lens group 110 into the space created by the withdrawal.

Although the second lens group 210 and the third lens group 310 are combined to form the internal conversion lens in the present embodiment, the present disclosure is not limited to this. For example, a switching between the first focal length range and the second focal length range may be achieved by the second lens group 210 alone. In this case, the third lens group 310 may be a neutral density filter, a protective filter, or a polarizing filter.

Second Embodiment

A second embodiment of the present disclosure will now be described.

Figure 14:
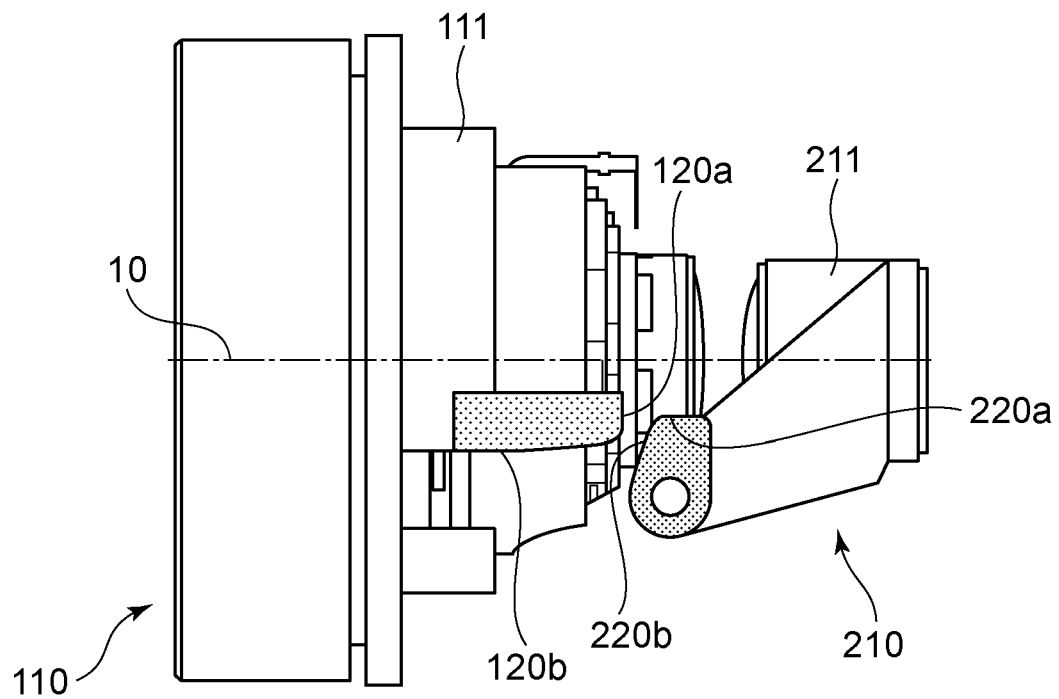
FIG. 14 is an external view of each lens group in an interchangeable lens (second focal length range) according to a second embodiment.
Figure 19:
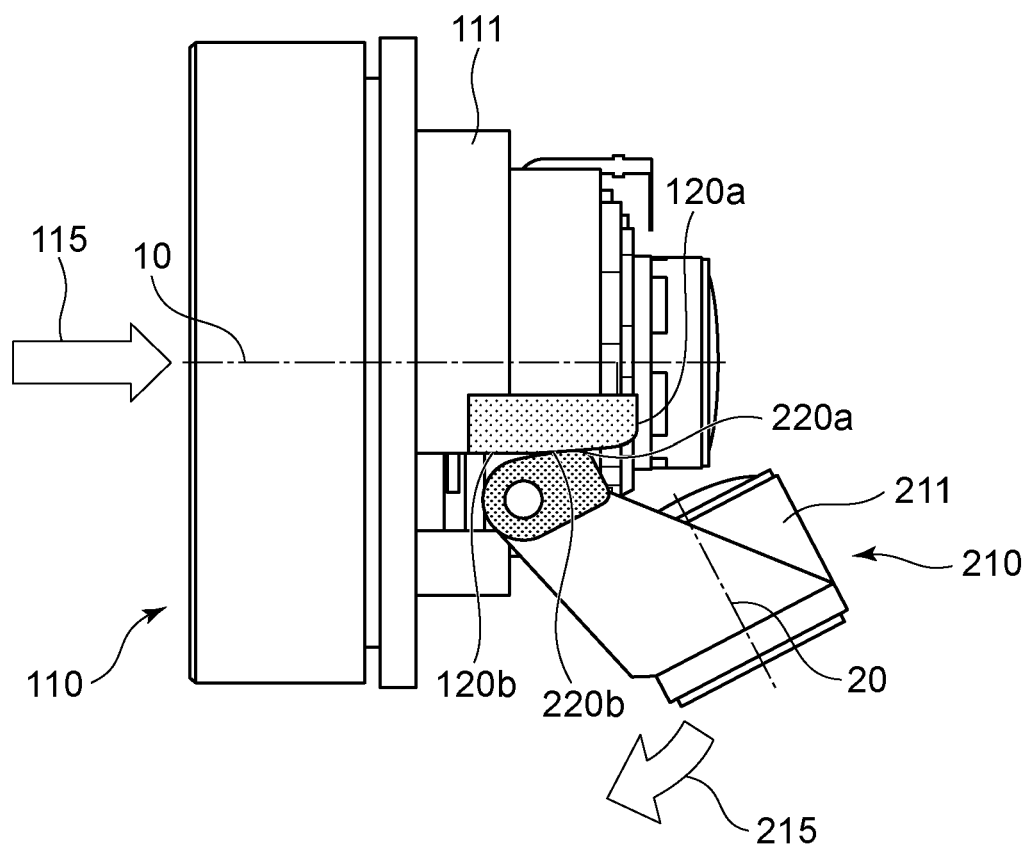
FIG. 19 is an external view of each lens group in the interchangeable lens (during transition) according to the second embodiment.
Figure 20:
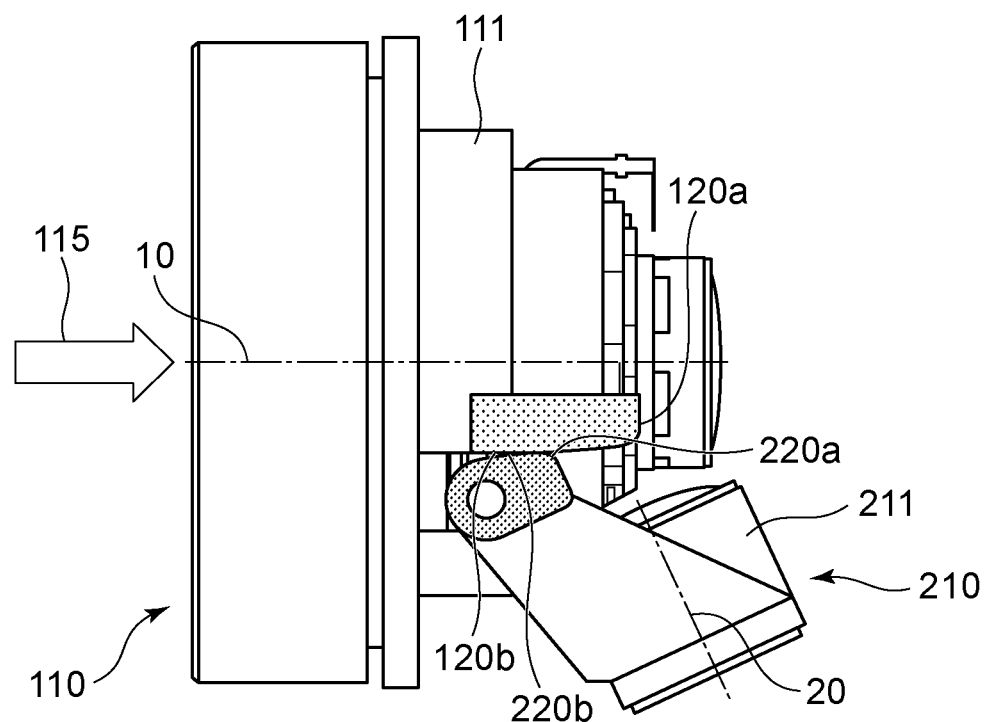
FIG. 20 is an external view of each lens group in the interchangeable lens (during transition) according to the second embodiment.
Figure 21:
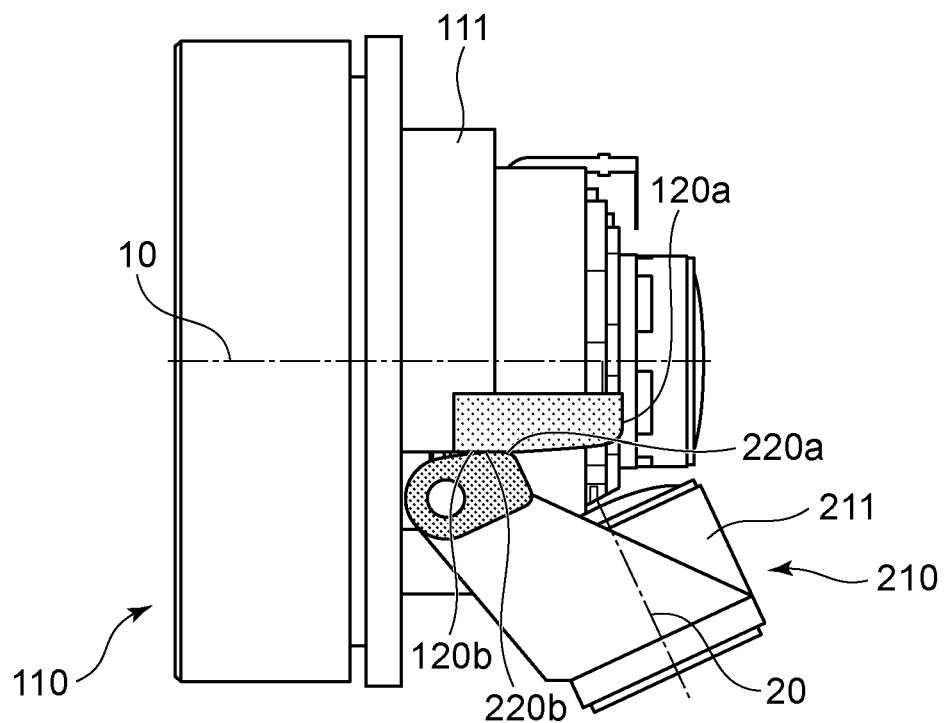
FIG. 21 is an external view of each lens group in the interchangeable lens (first focal length range) according to the second embodiment.

With reference to FIG. 14 to FIG. 21, movement of each lens group of the interchangeable lens 100 according to the present embodiment will be described in detail. FIG. 14 to FIG. 21 are external views of the first lens group 110 and the second lens group 210. FIG. 14 to FIG. 21 illustrate the XZ plane, as viewed in the Y axis direction, and illustrate a transition from the second focal length range to the first focal length range. FIG. 14 is an external view of each lens group in the interchangeable lens 100 (second focal length range) according to the present embodiment. FIG. 15 to FIG. 20 are external views of each lens group in the interchangeable lens 100 (during transition) according to the present embodiment. FIG. 21 is an external view of each lens group in the interchangeable lens 100 (first focal length range) according to the present embodiment.

FIG. 14 illustrates the interchangeable lens 100 that provides the second focal length range. As illustrated, the first lens group 110 and the second lens group 210 are arranged in this order from the subject side, at given positions on the first optical axis 10. When the interchangeable lens 100 provides the second focal length range, desired focusing (focus adjustment) can be performed by moving the first lens group 110 along the first optical axis 10. This does not involve positional movement of the second lens group 210.

The first lens group 110 is provided with a first contact portion 120 disposed closer to the image plane 16 than a lens of the first lens group 110 closest to the subject is. The second lens group 210 is provided with a second contact portion 220 disposed closer to the subject than a lens of the second lens group 210 closest to the subject is. Although the first contact portion 120 is formed integrally with a first retaining frame 111 in the present embodiment, the first contact portion 120 may be formed as a separate component and secured to the first retaining frame 111. Similarly, although the second contact portion 210 is formed integrally with a second retaining frame 211, the second contact portion 210 may be formed as a separate component and secured to the second retaining frame 211.

Figure 15:
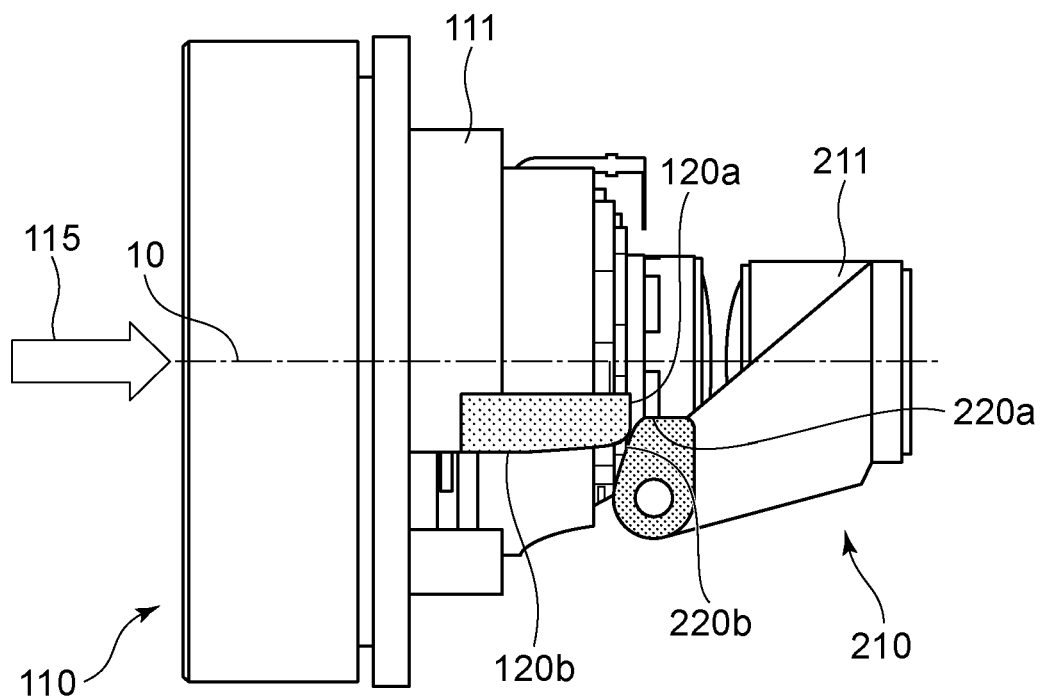
FIG. 15 is an external view of each lens group in the interchangeable lens (during transition) according to the second embodiment.
Figure 16:
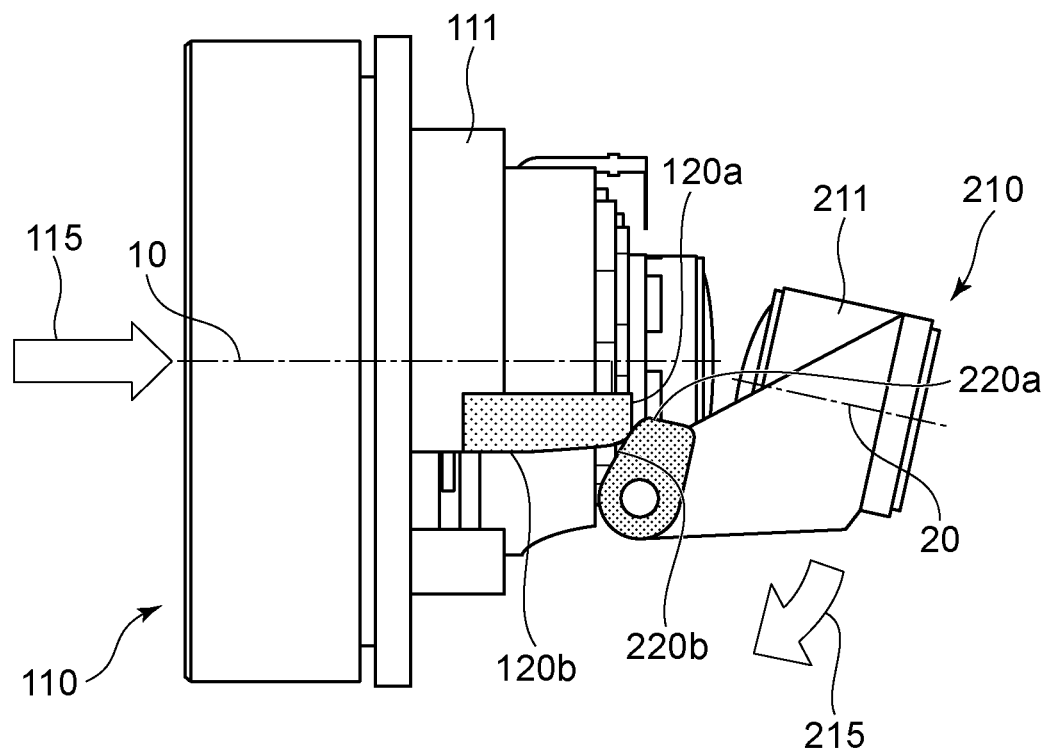
FIG. 16 is an external view of each lens group in the interchangeable lens (during transition) according to the second embodiment.
Figure 17:
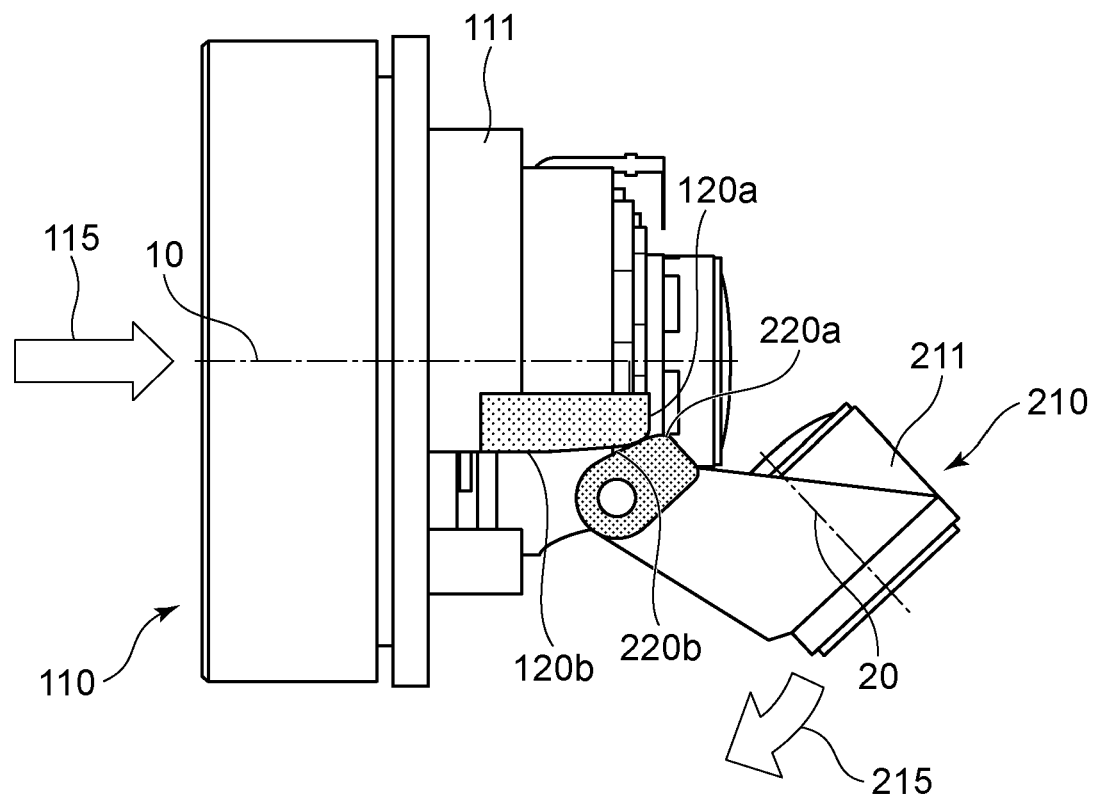
FIG. 17 is an external view of each lens group in the interchangeable lens (during transition) according to the second embodiment.
Figure 18:
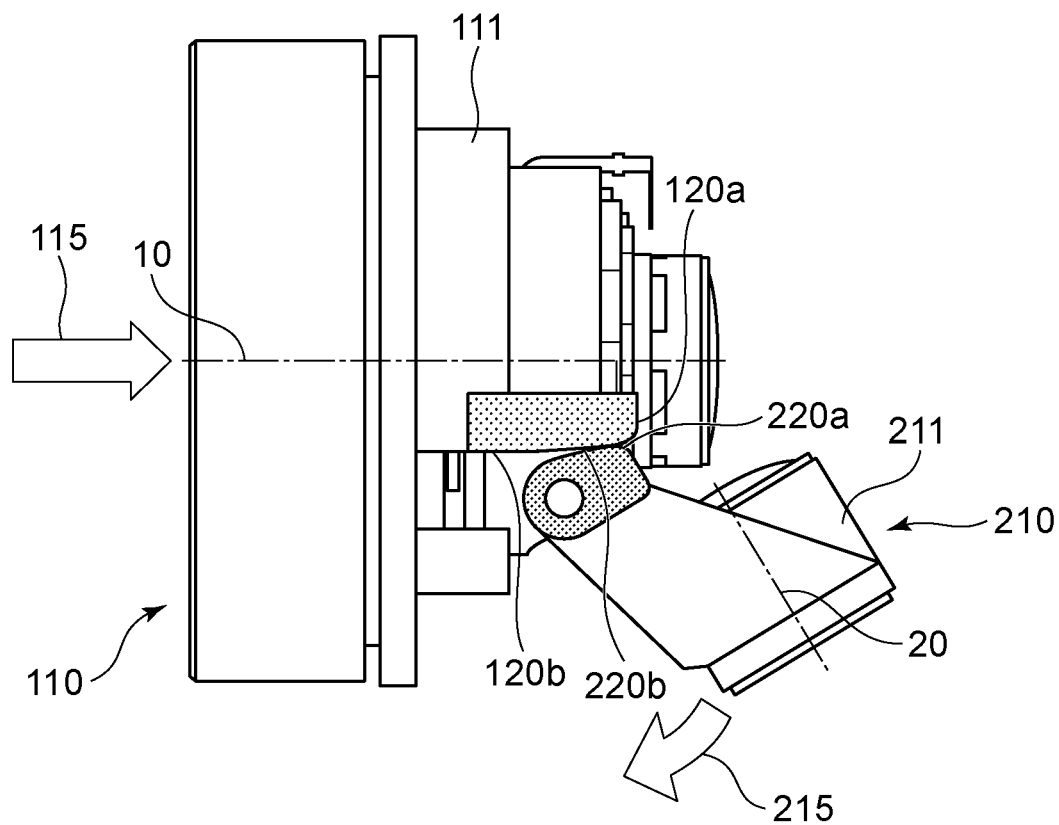
FIG. 18 is an external view of each lens group in the interchangeable lens (during transition) according to the second embodiment.

As illustrated in FIG. 14 to FIG. 21, the first contact portion 120 has a first contact surface 120a and a first sliding surface 120b. Similarly, the second contact portion 220 has a second contact surface 220a and a second sliding surface 220b. When the interchangeable lens 100 provides the second focal length range as illustrated in FIG. 14, the first contact surface 120a and the second contact surface 220a may be brought closer to each other by moving the first lens group 110 for desired focusing (focus adjustment), but are not brought into contact with each other. The second lens group 210 starts to withdraw when, as illustrated in FIG. 15 and FIG. 16, the first contact surface 120a and the second contact surface 220a are brought into contact. The second lens group 210 completes the withdrawal when, as illustrated in FIG. 19 and FIG. 20, the first sliding surface 120b and the second sliding surface 220b slide with respect to each other.

When the interchangeable lens 100 makes a transition from the second focal length range to the first focal length range, first, the first lens group 110 starts to move in the first direction 115 substantially parallel to the first optical axis 10 (FIG. 15). This brings the first contact surface 120a into contact with the second contact surface 220a. In the present embodiment, the second contact surface 220a and the second sliding surface 220b constitute a continuous plane slightly inclined from a plane orthogonal to the first optical axis 10 (i.e., plane parallel to the image plane 16).

As the first lens group 110 further moves toward the image plane 16 in the first direction 115, the second lens group 210 starts to withdraw in the second direction 215 (FIG. 16). The second contact surface 220a and the second sliding surface 220b rotate integrally with the second lens group 210 while increasing the inclination from the plane orthogonal to the first optical axis 10 (i.e., plane parallel to the image plane 16).

When the second lens group 210 withdraws further in the second direction 215, the first lens group 110 moves into the space created by the withdrawal (FIG. 17 to FIG. 19). The second optical axis 20, which is the optical center of the second lens group 210, increases its angle with the first optical axis 10 as the withdrawal of the second lens group 210 proceeds. The second lens group 210 is greater in lens diameter than in lens thickness. Therefore, as compared to withdrawing the second lens group 210 in the direction parallel to the radial direction, withdrawing it at an angle while rotating it can save more space in the radial direction and can more effectively prevent size increase of the interchangeable lens 100.

FIG. 20 illustrates the second lens group 210 that has completed the withdrawal to a given position. Even after completion of the withdrawal of the second lens group 210, the first lens group 110 continues to move in the first direction 115. The first sliding surface 120b moves toward the image plane 16 while sliding with respect to the second sliding surface 220b and maintaining contact therewith. Then, when the first lens group 110 further moves in the first direction 115 and completes the movement to a given position, the transition from the second focal length range to the first focal length range ends (FIG. 21).

The first lens group 110 illustrated in FIG. 21 is closer to the image plane 16 than that illustrated in any of FIG. 14 to FIG. 20 is. The transition from the second focal length range to the first focal length range can thus shorten the overall length of the interchangeable lens 100. Since the first lens group 110 has the first focal length range, image pickup is possible even when the overall lens length is minimized by completion of the withdrawal of the lens group 210 and the movement of the first lens group 110 toward the image plane 16.

Even when the interchangeable lens 100 provides the first focal length range, desired focusing (focus adjustment) can be performed by moving the first lens group 110 along the first optical axis 10. At this point, the length of the first sliding surface 120b in the direction of the first optical axis 10 is longer than the distance traveled by the lens of the first lens group 110 closest to the subject after completion of the withdrawal of the second lens group 210. Therefore, the second sliding surface 220b is unlikely to fall off the first sliding surface 120b even when the first lens group 110 moves along the first optical axis 10.

A transition from the second focal length range to the first focal length range has been described. Conversely, for a transition from the first focal length range to the second focal length range, the process illustrated in FIG. 14 to FIG. 21 is carried out in reverse order. In the present embodiment, the second lens group 210 is constantly biased by a biasing member (not shown) in the direction opposite the second direction 215. When the first lens group 110 moves from the image plane side toward the subject side, the second lens group 210 rotates to move from the withdrawal position illustrated in FIG. 20 and FIG. 21 to the position on the first optical axis 10 illustrated in FIG. 15 while the first sliding surface 120b and the second sliding surface 220b slide with respect to each other.

When the second focal length range is provided, the second lens group 210 is rotationally regulated by a regulating member (not shown) and aligned with and secured in place on the first optical axis 10. The first lens group 110 and the second lens group 210 are thus arranged as illustrated in FIG. 14, with the first contact surface 120a and the second contact surface 220a being spaced apart.

When the interchangeable lens 100 makes a transition again from the second focal length range to the first focal length range, the first lens group 110 moves the second lens group 210 toward the withdrawal position against biasing force of the biasing member (not shown). The interchangeable lens 100 according to the present embodiment is thus configured to be capable of switching between the first focal length range and the second focal length range without using a dedicated actuator.

Figure 22:
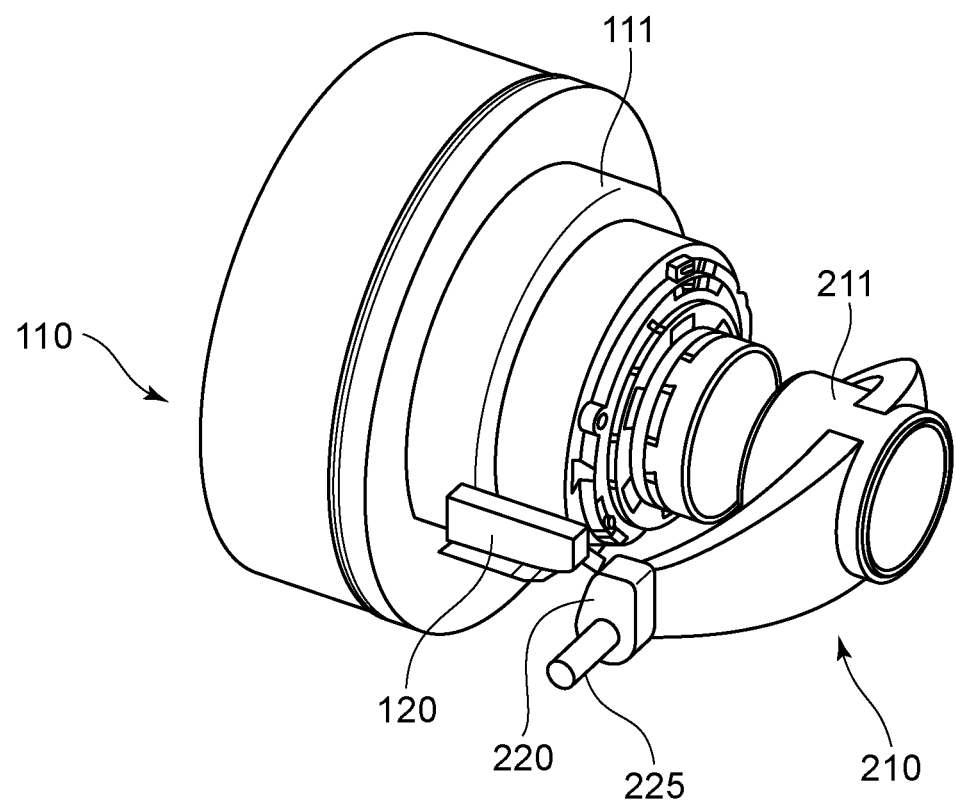
FIG. 22 is a perspective view of each lens group in the interchangeable lens (second focal length range) according to the second embodiment.

FIG. 22 is a perspective view that illustrates, like FIG. 14, the interchangeable lens 100 that provides the second focal length range. As illustrated, the first lens group 110 and the second lens group 210 are arranged in this order from the subject side, at given positions on the first optical axis 10. At this point, the first contact portion 120 and the second contact portion 220 are spaced apart.

Figure 23:
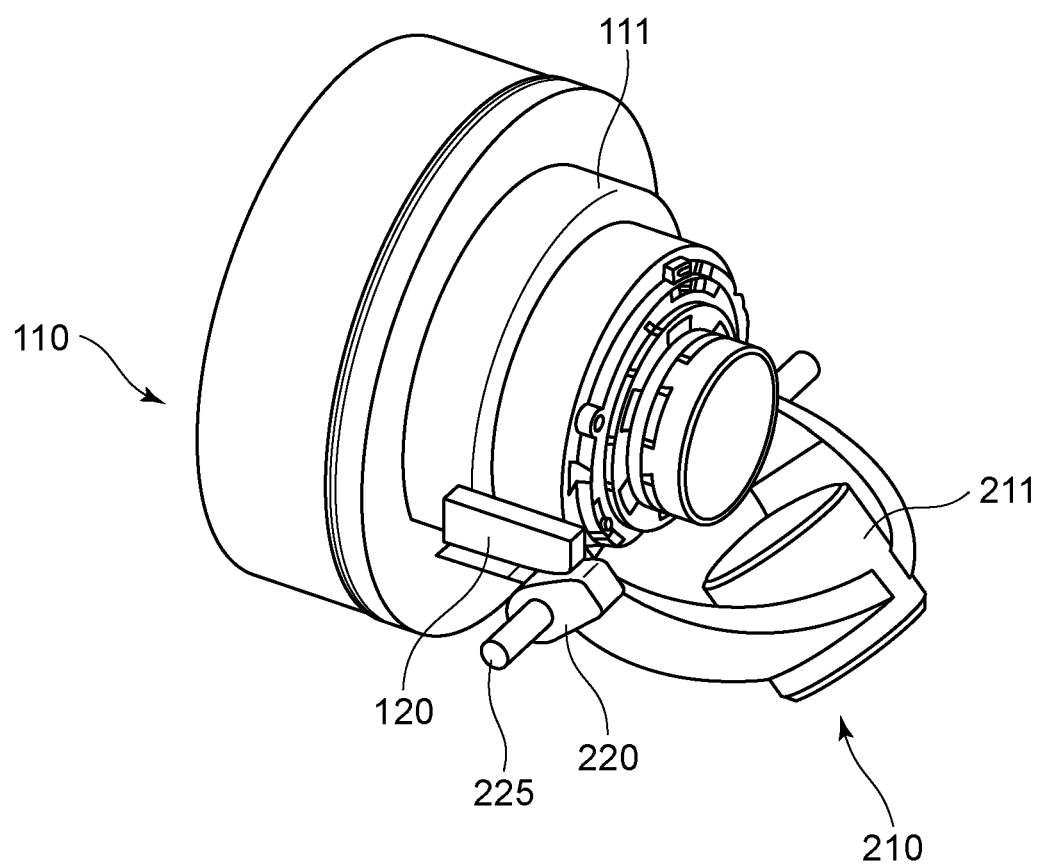
FIG. 23 is a perspective view of each lens group in the interchangeable lens (during transition) according to the second embodiment.

FIG. 23 is a perspective view that illustrates, like FIG. 17, a process of transition from the second focal length range to the first focal length range. The second lens group 210 has a rotary shaft 225, on which the second lens group 210 rotates to withdraw along an arc path.

Figure 24:
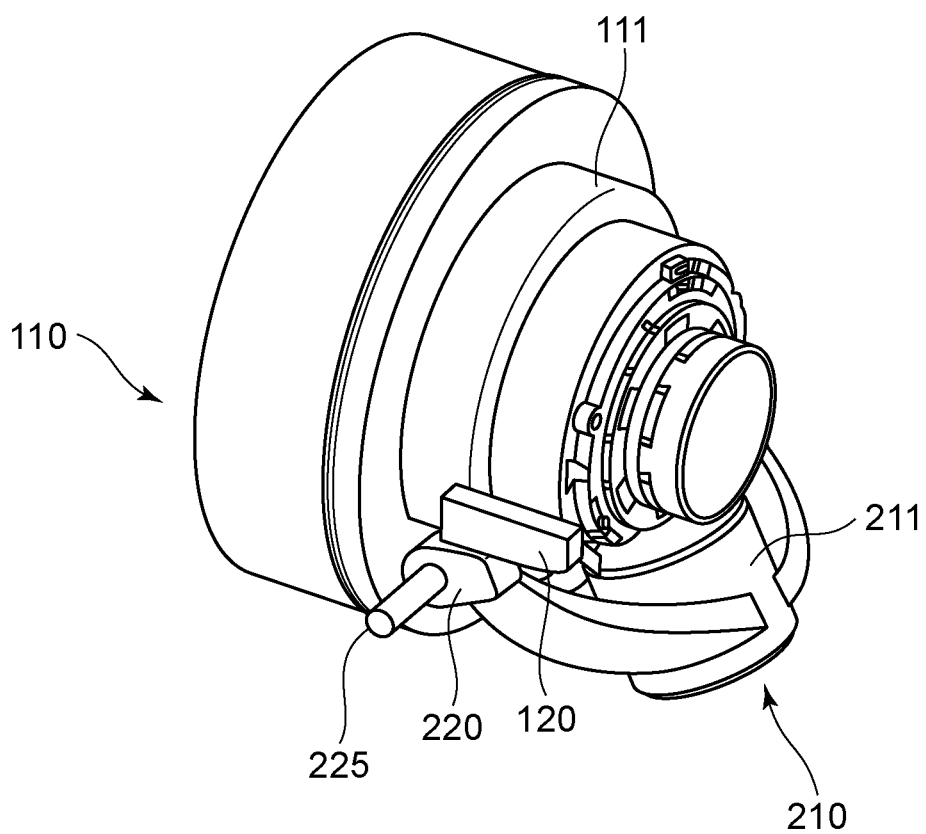
FIG. 24 is a perspective view of each lens group in the interchangeable lens (first focal length range) according to the second embodiment.

FIG. 24 is a perspective view that illustrates, like FIG. 21, the interchangeable lens 100 that provides the first focal length range. At this point, the transition from the second focal length range to the first focal length range has been completed and the second lens group 210 stays at the withdrawal position.

When a transition from the second focal length range to the first focal length range takes place in the present embodiment, the lens of the second lens group 210 closest to the subject is once separated from the lens of the first lens group 110 closest to the image plane 16. After the separation, the lens of the second lens group 210 closest to the subject completes the withdrawal at a position close to a side face of the first retaining frame 111. Thus, as compared to the case where the second lens group 210 completes the withdrawal at a distance from the first lens group 110, it is possible to save more space in the radial direction and more effectively prevent size increase of the interchangeable lens 100.

As illustrated in FIG. 3 and FIG. 4, the interchangeable lens 100 may include the third lens group 310 on the side of the second lens group 210 adjacent to the image plane 16. When the second focal length range is provided, the first lens group 110, the second lens group 210, and the third lens group 310 are arranged at given positions on the first optical axis 10. When a transition from the second focal length range to the first focal length range takes place, the third lens group 310 may withdraw in a direction different from the second direction 215, as the second lens group 210 withdraws in the second direction 215.

As described above, the first lens group 110 according to the present embodiment moves toward the image plane 16 in the first direction 115 substantially parallel to the first optical axis 10, and the second lens group 210 moves in the second direction 215. The second lens group 210 moves toward the subject in the direction of the first optical axis 10, and moves away from the first optical axis 10 in the radial direction. When the second lens group 210 completes the withdrawal and the first lens group 110 completes the movement in the first direction 115 at a given position on the image plane side, the transition from the second focal length range to the first focal length range ends.

As described above, in the present embodiment, the configuration for withdrawing the internal conversion lens is made more efficient to prevent size increase of the lens.

Although the internal conversion lens is constituted by the second lens group 210 alone in the present embodiment, the present disclosure is not limited to this. For example, a switching between the first focal length range and the second focal length range may be achieved by a combination of the second lens group 210 and the third lens group 310. In this case, the third lens group 310 may be a neutral density filter, a protective filter, or a polarizing filter.

Third Embodiment

A third embodiment of the present disclosure will now be described.

Figure 25:
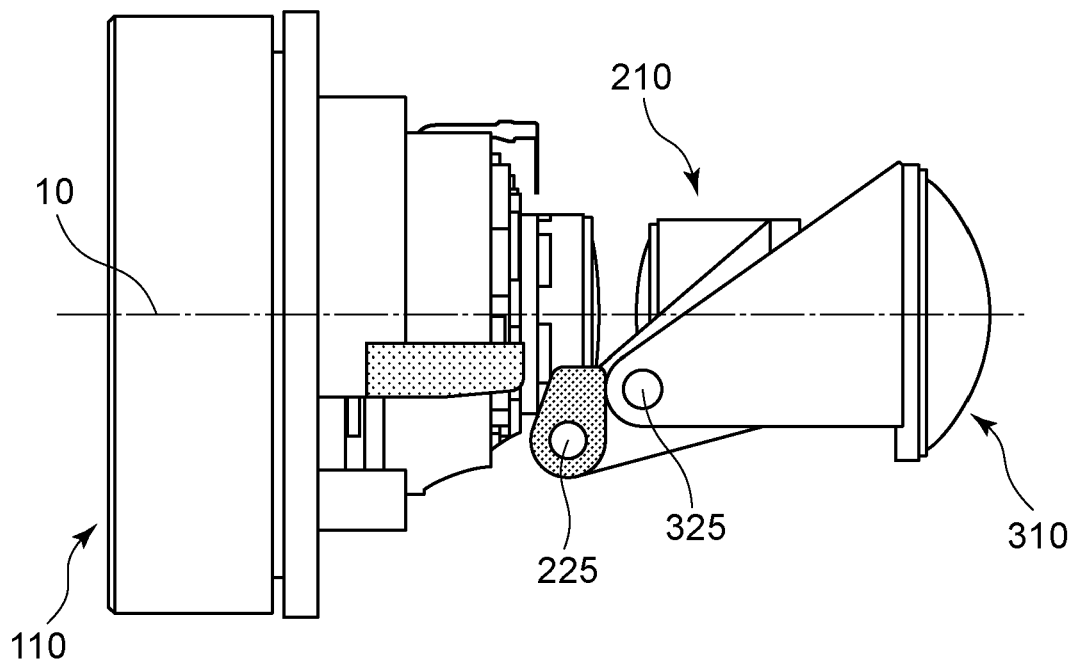
FIG. 25 is an external view of each lens group in an interchangeable lens (second focal length range) according to a third embodiment.
Figure 30:
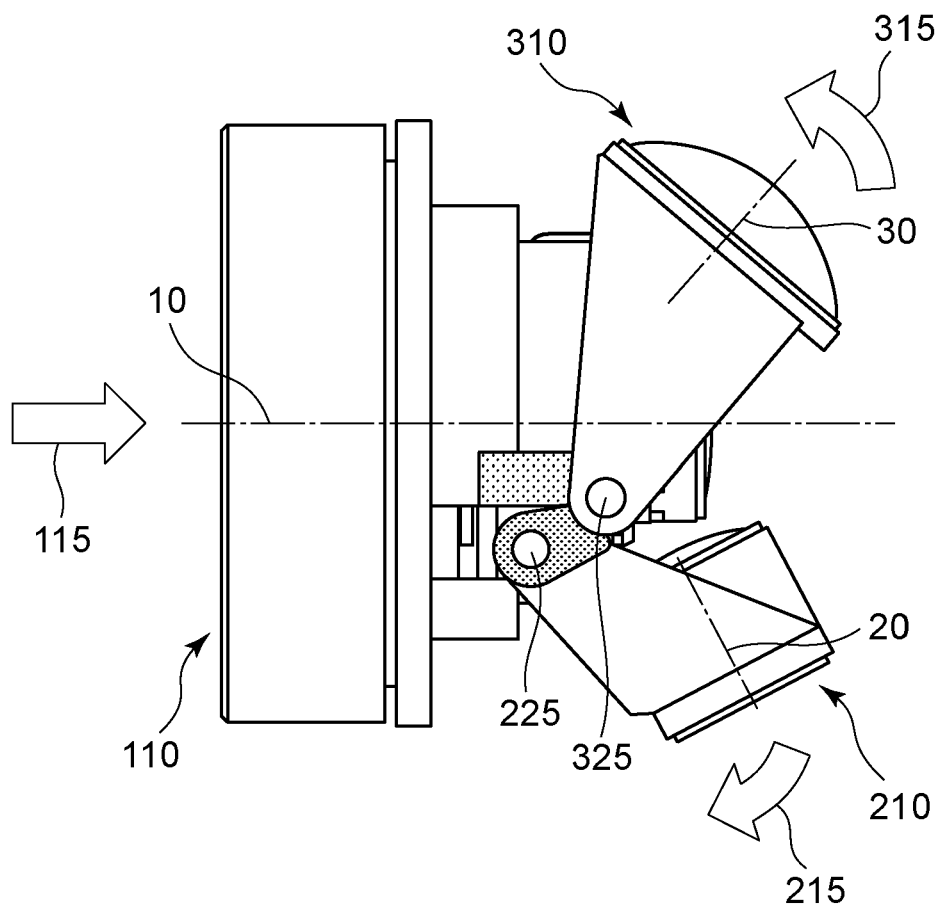
FIG. 30 is an external view of each lens group in the interchangeable lens (during transition) according to the third embodiment.
Figure 31:
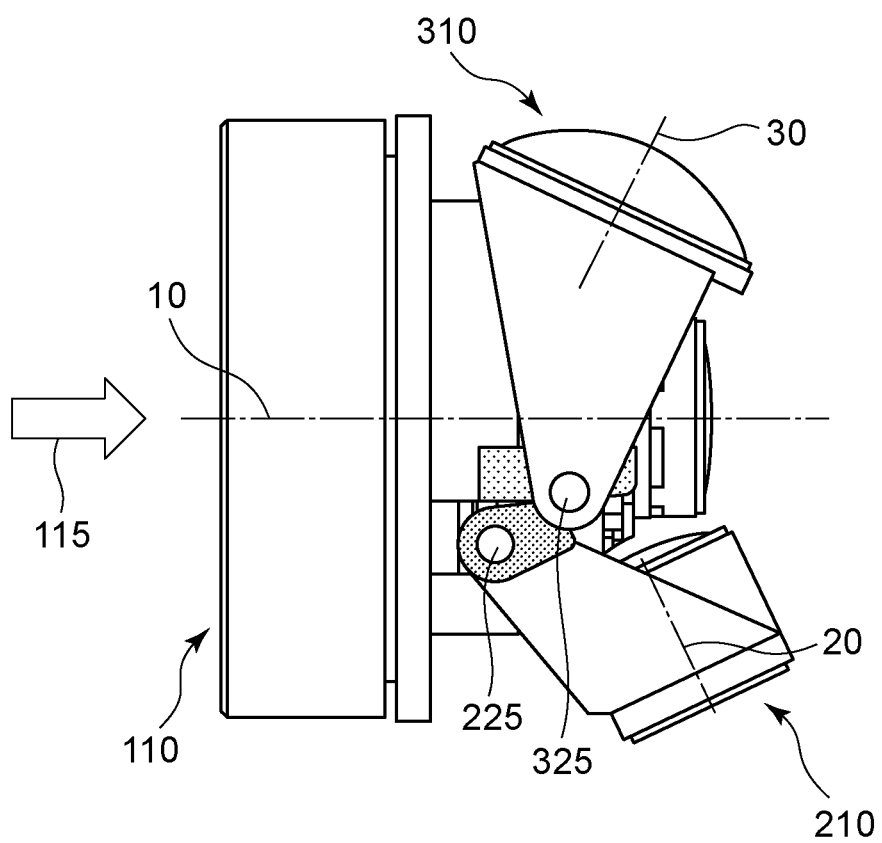
FIG. 31 is an external view of each lens group in the interchangeable lens (during transition) according to the third embodiment.
Figure 32:
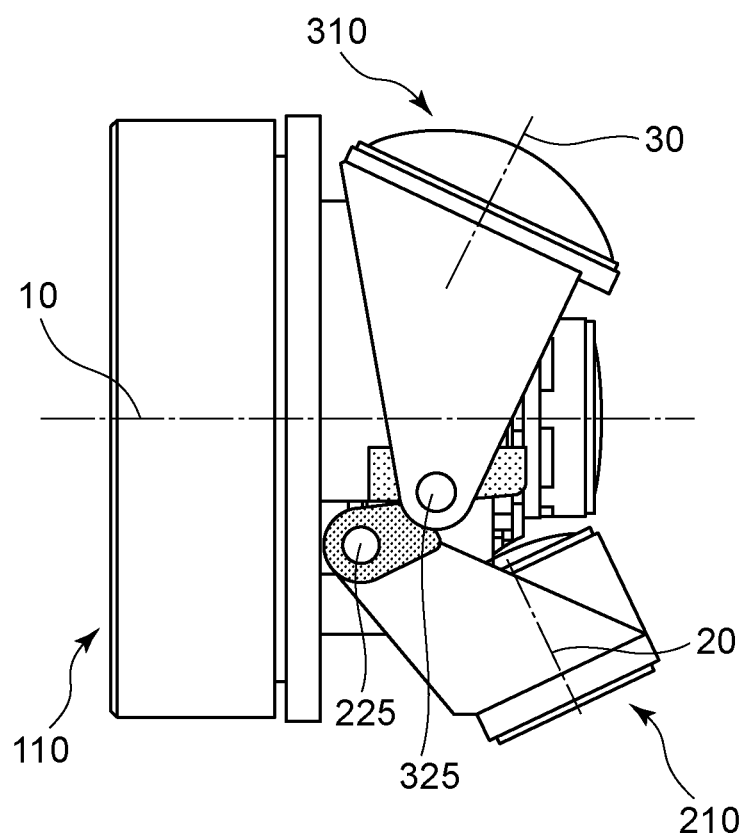
FIG. 32 is an external view of each lens group in the interchangeable lens (first focal length range) according to the third embodiment.

With reference to FIG. 25 to FIG. 32, movement of each lens group of the interchangeable lens 100 according to the present embodiment will be described in detail. FIG. 25 to FIG. 32 are external views of the first lens group 110, the second lens group 210, and the third lens group 310. FIG. 25 to FIG. 32 illustrate the XZ plane, as viewed in the Y axis direction, and illustrate a transition from the second focal length range to the first focal length range. FIG. 25 is an external view of each lens group in the interchangeable lens 100 (second focal length range) according to the present embodiment. FIG. 26 to FIG. 31 are external views of each lens group in the interchangeable lens 100 (during transition) according to the present embodiment. FIG. 32 is an external view of each lens group in the interchangeable lens 100 (first focal length range) according to the present embodiment.

FIG. 25 illustrates the optical system that provides the second focal length range. FIG. 25 shows that the first lens group 110, the second lens group 210, and the third lens group 310 are arranged in this order from the subject side, at given positions on the first optical axis 10. When the interchangeable lens 100 provides the second focal length range, desired focusing (focus adjustment) can be performed by moving the first lens group 110 along the first optical axis 10. This does not involve positional movement of the second lens group 210 and the third lens group 310.

The second lens group 210 has a first rotary shaft 225 whose center is substantially orthogonal to the first optical axis 10. The third lens group 310 has a second rotary shaft 325 whose center is substantially orthogonal to the first optical axis 10. If the first rotary shaft 225 is long enough to penetrate the first lens group 110, the first rotary shaft 225 interferes with the first lens group 110 when the first lens group 110 moves toward the image plane 16. Similarly, if the second rotary shaft 325 is long enough to penetrate the first lens group 110, the second rotary shaft 325 interferes with the first lens group 110 when the first lens group 110 moves toward the image plane 16. Accordingly, in the present embodiment, the first rotary shaft 225 and the second rotary shaft 325 are each divided into two parts that are opposite each other, with a plane orthogonal to the rotation center therebetween. The first rotary shaft 225 can thus be disposed at a position overlapping the first lens group 110 in the direction of the first optical axis 10, and this makes space saving possible. Similarly, the second rotary shaft 325 can be disposed at a position overlapping the second lens group 210 in the direction of the first optical axis 10. If the first rotary shaft 225 and the second rotary shaft 325 are not long enough to penetrate the first lens group 110, they both may not be divided and may be disposed on only one side of the plane orthogonal to the rotation center.

Figure 26:
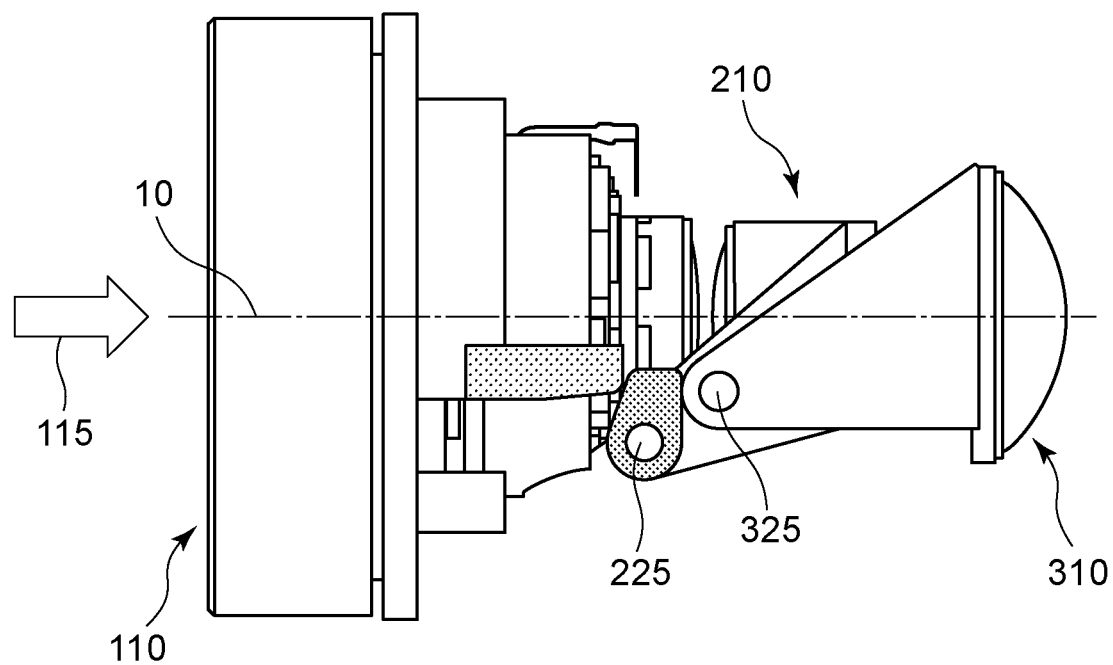
FIG. 26 is an external view of each lens group in the interchangeable lens (during transition) according to the third embodiment.

When the interchangeable lens 100 makes a transition from the second focal length range to the first focal length range, first, the first lens group 110 starts to move in the first direction 115 substantially parallel to the first optical axis 10 (FIG. 26).

Figure 27:
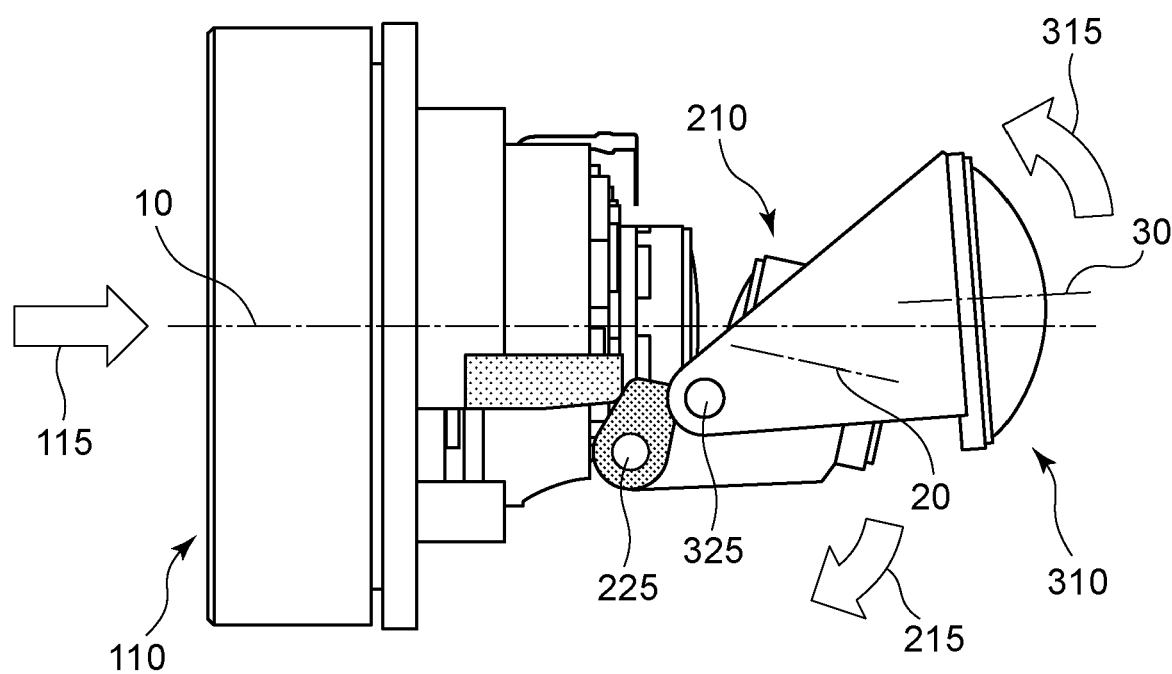
FIG. 27 is an external view of each lens group in the interchangeable lens (during transition) according to the third embodiment.

As the first lens group 110 further moves toward the image plane 16 in the first direction 115, the second lens group 210 and the third lens group 310 start to withdraw in the second direction 215 and the third direction 315, respectively (FIG. 27).

At this point, in a plane substantially parallel to the image plane 16, that is, as viewed in the direction of the first optical axis 10, the first rotary shaft 225 is disposed in the same phase as the second direction 215 in which the second lens group 210 withdraws. On the other hand, in a plane substantially parallel to the image plane 16, that is, as viewed in the direction of the first optical axis 10, the second rotary shaft 325 is disposed in the phase opposite that of the third direction 315 in which the third lens group 310 withdraws.

As a driving source (not shown) for withdrawing each of the second lens group 210 and the third lens group 310, the present embodiment assumes a dedicated actuator, such as that described as related art in Japanese Patent Laid-Open No. 11-311828. The present disclosure is not limited to this. For example, a configuration of an optical device that adopts a collapsible mechanism, such as that described above, is disclosed in which a retractable lens is moved by driving force of a zoom motor that shortens the overall lens length. The present disclosure may be implemented by combining the known techniques described above.

As for the directions of withdrawal of the second lens group 210 and the third lens group 310, the second direction 215 and the third direction 315 are opposite each other, with the first optical axis 10 therebetween. This can reduce vibration and changes in the center of gravity that occur as the second lens group 210 moves in the second direction 215 and the third lens group 310 moves in the third direction 315.

FIG. 25 to FIG. 32 are external views including the first optical axis 10, as viewed in the Y axis direction. FIG. 2 shows that the electrical connecting member 101 is located on the Y axis. The phases in which the second lens group 210 and the third lens group 310 withdraw thus differ from the phase of the electrical connecting member 101. This allows efficient use of space around the lens mount 102 and enables size reduction of the interchangeable lens 100.

The rotation centers of the first rotary shaft 225 and the second rotary shaft 325 are disposed to extend in the direction parallel to the Y axis. That is, the direction of the rotation centers of the first rotary shaft 225 and the second rotary shaft 325 coincides with the Y axis direction in which the camera body 1 with the interchangeable lens 100 attached thereto is placed by the user. Therefore, when the camera body 1 is placed, the second lens group 210 and the third lens group 310 are withdrawn in directions different from the Y axis direction in which impact is applied to the camera body 1. Accordingly, when the first rotary shaft 225 and the second rotary shaft 325 are disposed with the rotation centers thereof parallel to the Y axis direction, the interchangeable lens 100 has more rigidity against impact applied thereto in the Y axis direction and is less likely to be affected by the impact of a user's operation.

Figure 28:
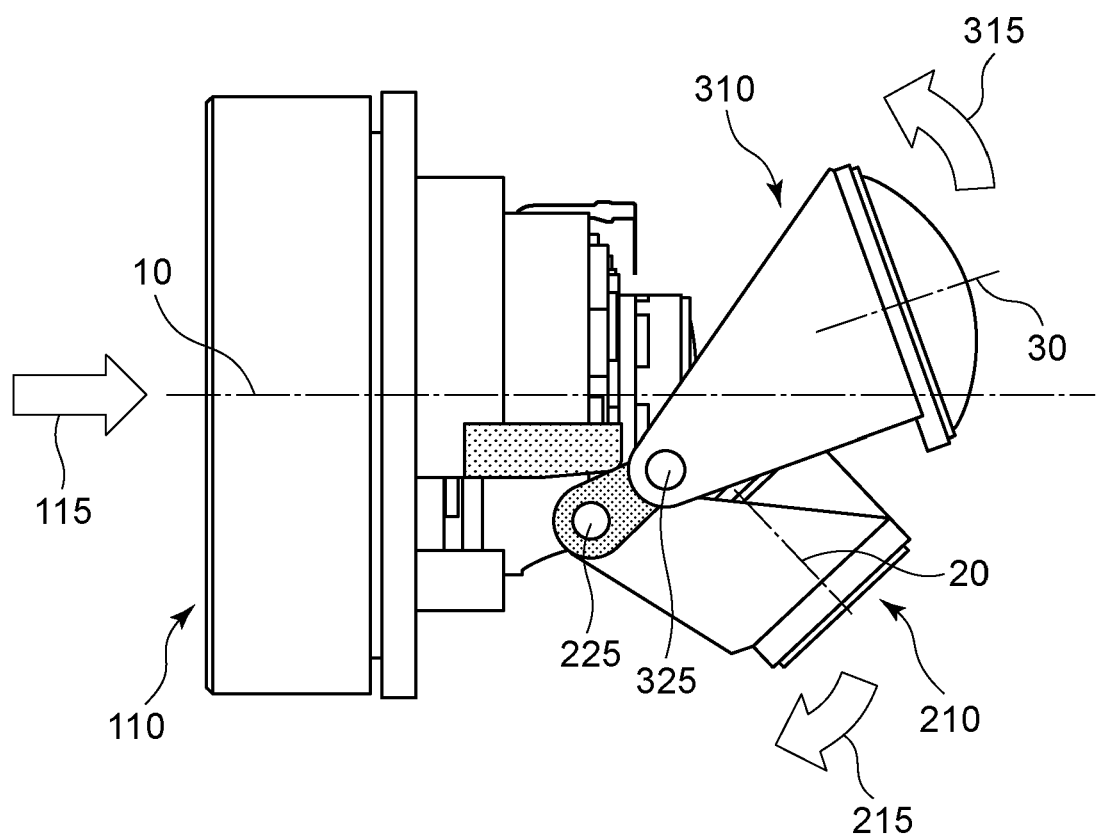
FIG. 28 is an external view of each lens group in the interchangeable lens (during transition) according to the third embodiment.
Figure 29:
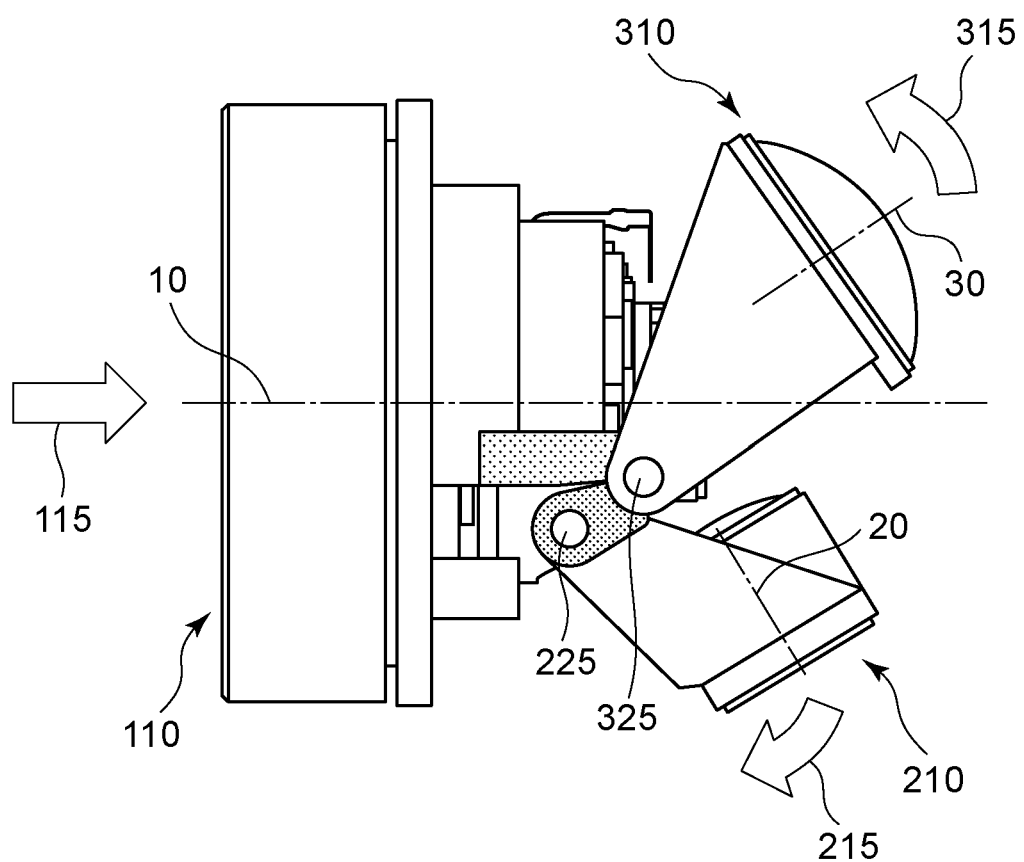
FIG. 29 is an external view of each lens group in the interchangeable lens (during transition) according to the third embodiment.

When the second lens group 210 withdraws further in the second direction 215 and the third lens group 310 withdraws further in the third direction 315, the first lens group 110 moves into the space created by the withdrawal of the second lens group 210 and the third lens group 310 (FIG. 28 to FIG. 30).

In the present embodiment, the third lens group 310 is heavier in weight and longer in withdrawal distance than the second lens group 210. With this configuration, in a plane substantially parallel to the image plane 16, that is, as viewed in the direction of the first optical axis 10, the second rotary shaft 325 is disposed in a phase opposite that of the third direction 315 in which the third lens group 310 withdraws. This arrangement of the second rotary shaft 325 and the third direction 315 allows the third lens group 310 to withdraw in the third direction 315 in which the withdrawal distance is longer than that in the second direction 215.

FIG. 31 illustrates the second lens group 210 and the third lens group 310 that have completed the withdrawal to given positions. Even after completion of the withdrawal of the second lens group 210 and the third lens group 310, the first lens group 110 continues to move in the first direction 115. Then, when the first lens group 110 further moves in the first direction 115 and completes the movement to a given position, the transition from the second focal length range to the first focal length range ends (FIG. 32).

The first lens group 110 illustrated in FIG. 32 is closer to the image plane 16 than that illustrated in any of FIG. 25 to FIG. 31 is. The transition from the second focal length range to the first focal length range can thus shorten the overall length of the interchangeable lens 100. Since the first lens group 110 has the first focal length range, image pickup is possible even when the overall lens length is minimized by completion of the withdrawal of the second lens group 210 and the third lens group 310 and the movement of the first lens group 110 toward the image plane 16. Even when the interchangeable lens 100 provides the first focal length range, desired focusing (focus adjustment) can be performed by moving the first lens group 110 along the first optical axis 10.

A transition from the second focal length range to the first focal length range has been described. Conversely, for a transition from the first focal length range to the second focal length range, the process illustrated in FIG. 25 to FIG. 32 is carried out in reverse order. For example, when the first lens group 110 is moved from the image plane side toward the subject by a user's operation, the second lens group 210 and the third lens group 310 rotate to move from the withdrawal positions illustrated in FIG. 31 and FIG. 32 to the positions on the first optical axis 10 illustrated in FIG. 6. The driving source for rotationally moving each of the second lens group 210 and the third lens group 310 is a dedicated actuator (not shown). When the second focal length range is provided, the second lens group 210 and the third lens group 310 are rotationally regulated by holding force of the actuators and secured in place on the first optical axis 10.

When the interchangeable lens 100 makes a transition again from the second focal length range to the first focal length range, the dedicated actuators (not shown) move the second lens group 210 and the third lens group 310 to the respective withdrawal positions. The interchangeable lens 100 according to the present embodiment is thus configured to be capable of switching between the first focal length range and the second focal length range by combining a user's operation with an operation by the dedicated actuators.

When the focal length range of the optical system is the first focal length range, the second rotary shaft 325 is disposed to overlap some components of the first lens group 110 in the direction of the first optical axis 10. In a plane substantially parallel to the image plane 16, that is, as viewed in the direction of the first optical axis 10, the second rotary shaft 325 is disposed outside the lens of the first lens group 110 closest to the image plane 16.

Figure 33:
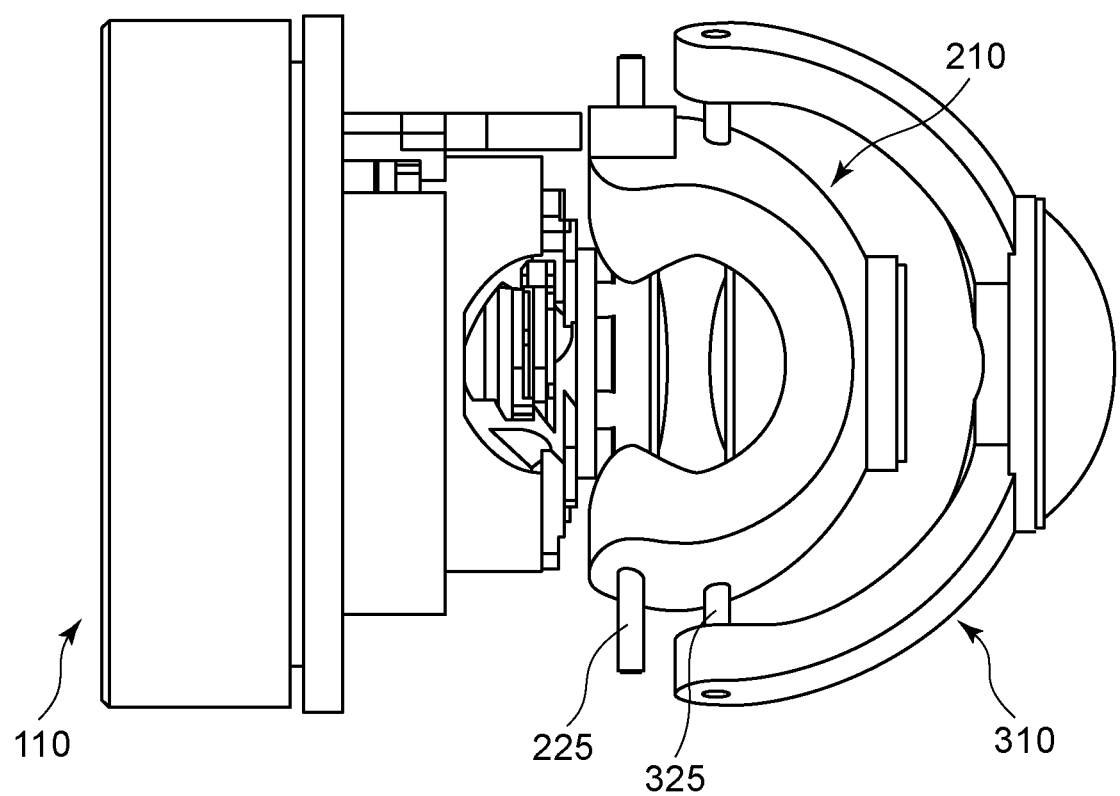
FIG. 33 is an external view of each lens group in the interchangeable lens (second focal length range) according to the third embodiment.
Figure 34:
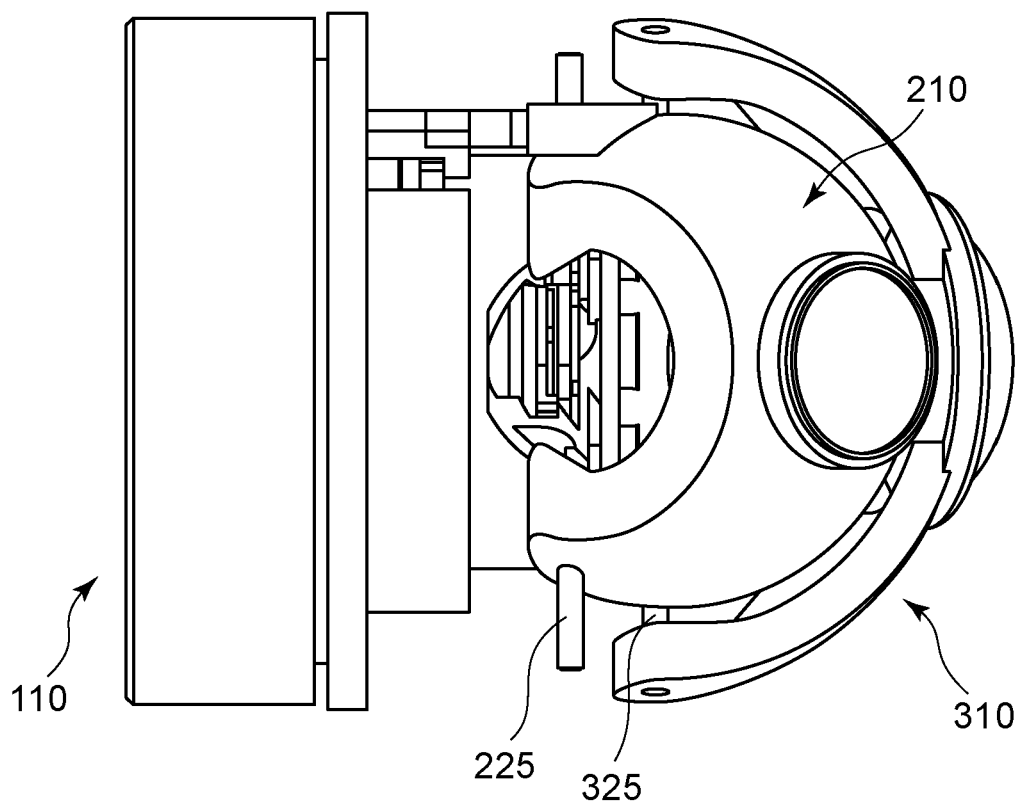
FIG. 34 is an external view of each lens group in the interchangeable lens (during transition) according to the third embodiment.
Figure 35:
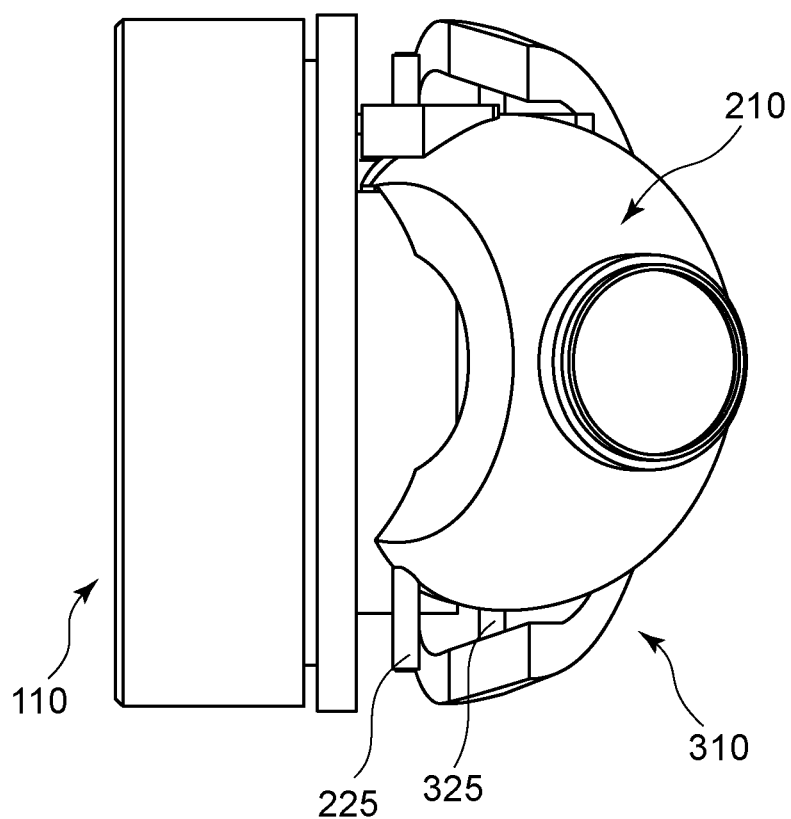
FIG. 35 is an external view of each lens group in the interchangeable lens (first focal length range) according to the third embodiment.

FIG. 33 to FIG. 35 are external views of the first lens group 110, the second lens group 210, and the third lens group 310 and illustrate the XY plane as viewed in the Z axis direction. FIG. 33 is an external view of each lens group in the interchangeable lens 100 (second focal length range) according to the present embodiment. The first lens group 110, the second lens group 210, and the third lens group 310 are arranged in this order from the subject side. The first rotary shaft 225 may be divided and arranged at positions opposite each other, with a plane orthogonal to the rotation center thereof therebetween. In this case, as viewed in the direction of the first optical axis 10, the first rotary shaft 225 is disposed outside the lens of the first lens group 110 closest to the image plane 16. The second rotary shaft 325 may also be divided and arranged at positions opposite each other, with a plane orthogonal to the rotation center thereof therebetween.

FIG. 34 is an external view of each lens group in the interchangeable lens 100 (during transition) according to the present embodiment. As viewed in the direction of the first optical axis 10, when the first rotary shaft 225 is disposed outside the lens of the first lens group 110 closest to the image plane 16, the first lens group 110 can be moved closer to the image plane 16 than when the second focal length range is provided.

FIG. 35 is an external view of each lens group in the interchangeable lens 100 (first focal length range) according to the present embodiment. At this point, the transition from the second focal length range to the first focal length range has been completed, and the second lens group 210 and the third lens group 310 stay at the withdrawal positions. In a plane substantially parallel to the image plane 16, that is, as viewed in the direction of the first optical axis 10, the second rotary shaft 325 is disposed outside the lens of the first lens group 110 closest to the image plane 16. Therefore, when the first focal length range is provided, the first rotary shaft 225 and the second rotary shaft 325 are disposed at positions that overlap the first lens group 110 in the direction of the first optical axis 10. This allows the first lens group 110, the second lens group 210, and the third lens group 310 to be disposed at overlapping positions in the direction of the first optical axis 10 and thus can shorten the overall length of the interchangeable lens 100.

As described above, the first lens group 110 according to the present embodiment moves toward the image plane 16 in the first direction 115 substantially parallel to the first optical axis 10, and the second lens group 210 moves in the second direction 215. The second lens group 210 moves toward the subject in the direction of the first optical axis 10, and moves away from the first optical axis 10 in the radial direction. By moving in the third direction 315, the third lens group 310 moves toward the subject in the direction of the first optical axis 10, and moves away from the second lens group 210 in the radial direction. The transition from the second focal length range to the first focal length range is thus completed.

In the configuration of the related art, the conversion lens is withdrawn into the space between the prism and the strobe light to change the focal length and reduce an increase in the overall size of the camera. However, this configuration is applicable only to a type of lens-integrated camera that includes a prism and a strobe light. Therefore, for interchangeable lenses or cameras that do not include at least one of a prism and a strobe light, it has been difficult to prevent a size increase. The present disclosure can prevent a size increase of the lens by making the withdrawal space of the internal conversion lens more efficient.

Although the second lens group 210 and the third lens group 310 are combined to form the internal conversion lens group in the present embodiment, the present disclosure is not limited to this. For example, a switching between the first focal length range and the second focal length range may be achieved by the second lens group 210 alone. In this case, the third lens group 310 may be a neutral density filter, a protective filter, or a polarizing filter.

Other Embodiments

The present disclosure can provide an optical device that can change the focal length range by withdrawing the internal conversion lens and can shorten the overall lens length by moving the master lens into the space created by the withdrawal. The present disclosure can also provide an optical device that can reduce an increase in lens size by making the configuration for withdrawing the internal conversion lens more efficient. The present disclosure can also provide an optical device that can reduce an increase in lens size by making the withdrawal space of the internal conversion lens more efficient.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-176784 filed Oct. 28, 2021, No. 2021-176785 filed Oct. 28, 2021, and No. 2021-176786 filed Oct. 28, 2021, which are hereby incorporated by reference herein in their entirety.

What is claimed is:

1. An optical device comprising:
   a first lens group corresponding to a first optical axis; and
   a second lens group corresponding to a second optical axis and configured to change a focal length range of an optical system from a first focal length range to a second focal length range by being disposed on the first optical axis on a side of the first lens group, the side being adjacent to an image plane;
   a second mount connectable to a first mount of a main body of an image pickup apparatus; and
   an electrical connecting member electrically connectable to the main body of the image pickup apparatus,
   wherein, in a plane parallel to the image plane, the first optical axis and the second optical axis are located in phases that do not overlap the electrical connecting member:
   the first lens group moves toward the image plane in a first direction parallel to the first optical axis;
   the second lens group moves in a second direction to allow at least part of the second lens group to overlap at least part of the first lens group in the first direction, and the second optical axis withdraws from the first optical axis; and
   an overall length of the optical device in a direction of the first optical axis is shorter when the focal length range of the optical system is the first focal length range, than when the focal length range of the optical system is the second focal length range.

2. The optical device according to claim 1, wherein the second lens group is closer to a subject in the first direction when the focal length range of the optical system is the first focal length range than when the focal length range of the optical system is the second focal length range.

3. The optical device according to claim 1, further comprising a third lens group,
   wherein when the focal length range of the optical system is the second focal length range, the third lens group is disposed on the first optical axis on a side of the second lens group, the side being adjacent to the image plane.

4. The optical device according to claim 3, wherein the third lens group is movable in a third direction different from the second direction.

5. The optical device according to claim 4, wherein the second direction and the third direction are opposite each other, with the first optical axis therebetween.

6. An optical device comprising:
   a first lens group corresponding to a first optical axis;
   a second lens group corresponding to a second optical axis and configured to change a focal length range of an optical system from a first focal length range to a second focal length range by being disposed on the first optical axis on a side of the first lens group, the side being adjacent to an image plane; and
   a second mount connectable to a first mount of a main body of an image pickup apparatus,
   wherein the first lens group and the second lens group are located closer to a subject than a connection surface for connection of the second mount and the first mount is,
   the first lens group moves toward the image plane in a first direction parallel to the first optical axis;
   the second lens group moves in a second direction to allow at least part of the second lens group to overlap at least part of the first lens group in the first direction, and the second optical axis withdraws from the first optical axis; and
   an overall length of the optical device in a direction of the first optical axis is shorter when the focal length range of the optical system is the first focal length range, than when the focal length range of the optical system is the second focal length range.

7. The optical device according to claim 1, wherein when the focal length range of the optical system is the first focal length range, at least part of the second lens group is located radially outside a fitting diameter of the first mount and the second mount in a plane parallel to the image plane.

8. The optical device according to claim 1, further comprising a third lens group,
   wherein when the focal length range of the optical system is the second focal length range, the third lens group is disposed on the first optical axis on a side of the second lens group, the side being adjacent to the image plane.

9. The optical device according to claim 8, wherein when the focal length range of the optical system is the second focal length range, at least part of the third lens group overlaps a connection surface for connection of the second mount and the first mount in the first direction.

10. The optical device according to claim 8, wherein when the focal length range of the optical system is the first focal length range, at least part of the third lens group is located radially outside a fitting diameter of the first mount and the second mount in a plane parallel to the image plane.

11. An optical device comprising:
    a first lens group corresponding to a first optical axis;
    a first retaining frame configured to retain the first lens group and having a first contact portion;
    a second lens group corresponding to a second optical axis and configured to change a focal length range of an optical system from a first focal length range to a second focal length range by being disposed on the first optical axis on a side of the first lens group, the side being adjacent to an image plane; and a second retaining frame configured to retain the second lens group and having a second contact portion, wherein when the focal length range of the optical system transitions from the second focal length range to the first focal length range, the second lens group starts to withdraw after the first lens group starts to move toward the image plane in a direction parallel to the first optical axis, and completes the withdrawal before the first lens group completes the movement, and the second optical axis is withdrawn at an angle from the first optical axis by contact of the first contact portion with the second contact portion.

12. The optical device according to claim 11, wherein when the focal length range of the optical system transitions from the second focal length range to the first focal length range, a lens of the second lens group closest to a subject is separated from a lens of the first lens group closest to the image plane and brought closer to the first retaining frame.

13. The optical device according to claim 6, wherein when the focal length range of the optical system is the first focal length range, at least part of the second lens group is located radially outside a fitting diameter of the first mount and the second mount in a plane parallel to the image plane.

14. The optical device according to claim 6, further comprising a third lens group, wherein when the focal length range of the optical system is the second focal length range, the third lens group is disposed on the first optical axis on a side of the second lens group, the side being adjacent to the image plane.

15. The optical device according to claim 14, wherein when the focal length range of the optical system is the second focal length range, at least part of the third lens group overlaps a connection surface for connection of the second mount and the first mount in the first direction.

16. The optical device according to claim 14, wherein when the focal length range of the optical system is the first focal length range, at least part of the third lens group is located radially outside a fitting diameter of the first mount and the second mount in a plane parallel to the image plane.

* * * * *